US012652600B2

(12) United States Patent
Liu et al.

(10) Patent No.: US 12,652,600 B2
(45) Date of Patent: Jun. 9, 2026

(54) WIRELESS COMMUNICATION METHOD AND TERMINAL DEVICE FOR RELAY COMMUNICATION

(71) Applicant: GUANGDONG OPPO MOBILE TELECOMMUNICATIONS CORP., LTD., Dongguan (CN)

(72) Inventors: Jianhua Liu, Dongguan (CN); Haorui Yang, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 596 days.

(21) Appl. No.: 17/723,267

(22) Filed: Apr. 18, 2022

(65) Prior Publication Data
US 2022/0248298 A1 Aug. 4, 2022

Related U.S. Application Data

(63) Continuation of application No. PCT/CN2019/112601, filed on Oct. 22, 2019.

(51) Int. Cl.
*H04W 88/04* (2009.01)
*H04L 45/00* (2022.01)
(Continued)

(52) U.S. Cl.
CPC ............. *H04W 40/02* (2013.01); *H04L 45/20* (2013.01); *H04W 40/24* (2013.01); *H04W 84/042* (2013.01); *H04W 88/04* (2013.01)

(58) Field of Classification Search
CPC ... H04W 40/02; H04W 40/24; H04W 84/042; H04W 88/04; H04L 45/20
See application file for complete search history.

(56) References Cited

U.S. PATENT DOCUMENTS

| | | | | |
|---|---|---|---|---|
| 2016/0072573 A1* | 3/2016 | Tohzaka | ............. | H04B 7/15507 |
| | | | | 370/315 |
| 2016/0088668 A1* | 3/2016 | Kim | .................. | H04W 52/0229 |
| | | | | 370/315 |

(Continued)

FOREIGN PATENT DOCUMENTS

| | | |
|---|---|---|
| CN | 106304257 A | 1/2017 |
| CN | 108541383 A | 9/2018 |

(Continued)

OTHER PUBLICATIONS

PE2E-Search Machine Translation of KR-20180125455-A, published on Nov. 23, 2018.*

(Continued)

*Primary Examiner* — Rafael Pérez-Gutiérrez
*Assistant Examiner* — Gilbert M. Grant
(74) *Attorney, Agent, or Firm* — Morgan, Lewis & Bockius LLP

(57) ABSTRACT
The embodiments of the present disclosure provide a wireless communication method and a terminal device, for enabling a remote terminal to access a network by means of multi-hop relay. The wireless communication method comprises: a first terminal device receives first information sent by a second terminal device for discovering a relay device; the first terminal device makes a response to the first information.

14 Claims, 5 Drawing Sheets

(51) Int. Cl.

| | |
|---|---|
| *H04W 40/02* | (2009.01) |
| *H04W 40/24* | (2009.01) |
| *H04W 84/04* | (2009.01) |

(56) References Cited

U.S. PATENT DOCUMENTS

| | | | | |
|---|---|---|---|---|
| 2016/0295492 | A1* | 10/2016 | He | H04W 40/02 |
| 2016/0323012 | A1* | 11/2016 | Kwon | H04B 1/7143 |
| 2016/0381720 | A1* | 12/2016 | Baek | H04W 8/14 |
| | | | | 370/329 |
| 2017/0222861 | A1 | 8/2017 | Jung et al. | |
| 2018/0152234 | A1* | 5/2018 | Huang | H04W 36/033 |
| 2018/0159616 | A1 | 6/2018 | Aminaka et al. | |
| 2018/0198701 | A1* | 7/2018 | Kosugi | H04W 40/02 |
| 2018/0317077 | A1 | 11/2018 | Kim et al. | |
| 2019/0363779 | A1* | 11/2019 | Chae | H04W 8/005 |
| 2020/0252853 | A1* | 8/2020 | Shi | H04W 40/22 |
| 2021/0368564 | A1* | 11/2021 | Liu | H04W 4/80 |
| 2022/0224409 | A1* | 7/2022 | Perras | H04B 7/2606 |

FOREIGN PATENT DOCUMENTS

| | | | |
|---|---|---|---|
| EP | 3235295 | A1 | 10/2017 |
| EP | 3297326 | A1 | 3/2018 |
| KR | 20180125455 | A * | 11/2018 ........... H04W 76/14 |
| WO | WO 2018105158 | A1 | 6/2018 |
| WO | WO 2021/077303 | A1 | 4/2021 |

OTHER PUBLICATIONS

Guangdong OPPO Mobile Telecommunications Corp. Ltd., Extended European Search Report, EP19949755.3, Sep. 2, 2022, 8 pgs.

Guangdong OPPO Mobile Telecommunications Corp. Ltd., International Search Report and Written Opinion, PCT/CN2019/112601, Jul. 13, 2020, 17 pgs.

3GPP TR 23.779 V13.0.0 (Sep. 2015); 3rd Generation Partnership Project; Technical Specification Group Services and System Aspects; Study on application architecture to support; Mission Critical Push to Talk over LTE (MCPTT) services (Release 13), 251 pgs.

Renesas Mobile Europe Ltd., Connection setup via ProSe UE-to-Network Relay, SA WG2 Temporary Document, SA WG2 Meeting #97, S2, 131971, May 27-31, 2013, Busan, South Korea, 4 pgs.

Guangdong OPPO Mobile Telecommunications Corp. Ltd., First Office Action, EP19949755.3, Nov. 22, 2024, 6 pgs.

* cited by examiner

10
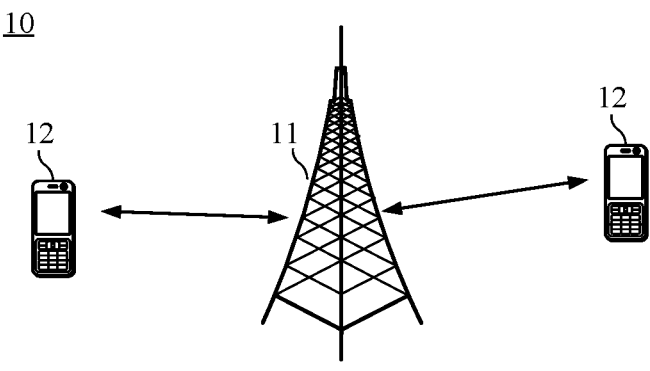
FIG. 1
20
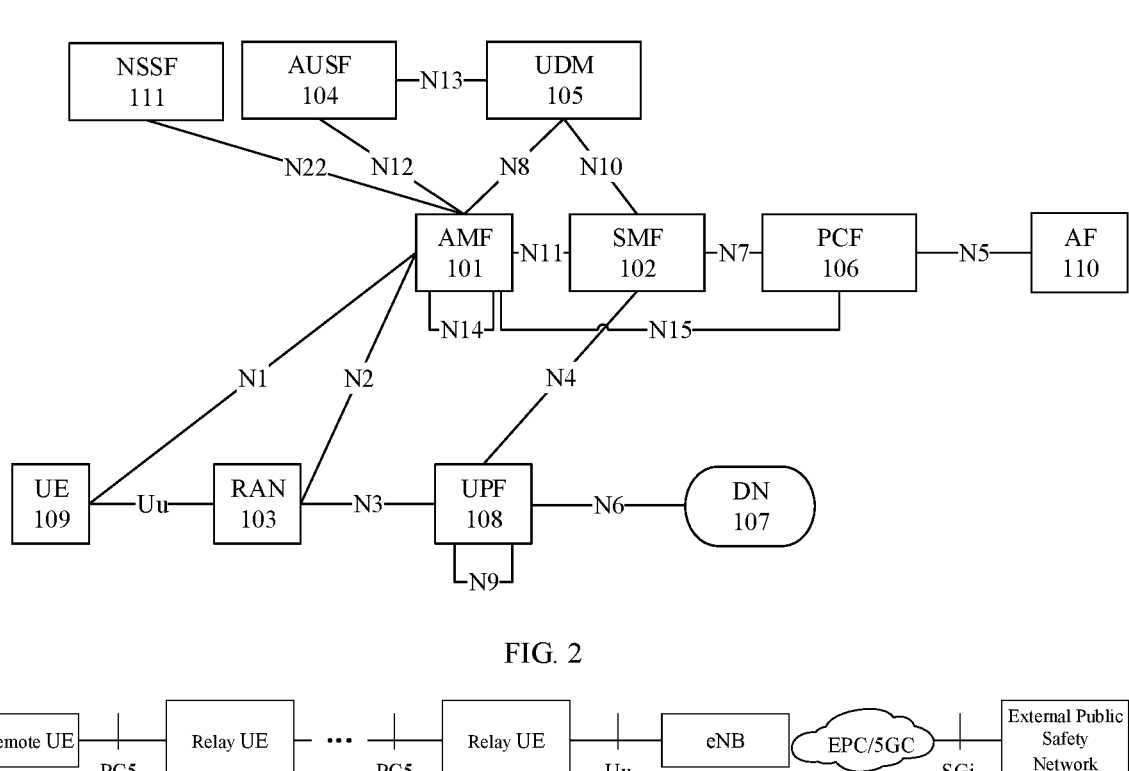
FIG. 2
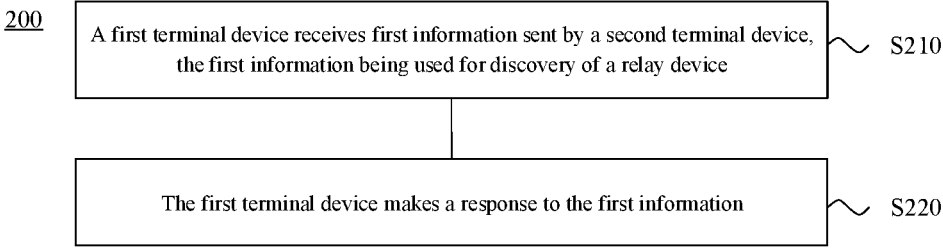
FIG. 3
200
| A first terminal device receives first information sent by a second terminal device, the first information being used for discovery of a relay device | S210 |
| The first terminal device makes a response to the first information | S220 |
FIG. 4

300

WIRELESS COMMUNICATION METHOD AND TERMINAL DEVICE FOR RELAY COMMUNICATION

CROSS-REFERENCE TO RELATED APPLICATIONS

This application is a continuation application of PCT Patent Application No. PCT/CN2019/112601, entitled "WIRELESS COMMUNICATION METHOD AND TERMINAL DEVICE" filed on Oct. 22, 2019, the disclosure of which is incorporated herein by reference in its entirety.

TECHNICAL FIELD

Embodiments of the present disclosure relate to the field of communication, and more particularly, to a wireless communication method and a terminal device.

BACKGROUND

In New Radio (NR), a remote terminal can be connected to a network through single-hop relay, and in the single-hop relay, a relay terminal can always reside in the network normally. However, for some areas with poor coverage, some relay terminals may not be able to reside in the network, that is, remote terminals cannot access the network through the single-hop relay.

SUMMARY

Embodiments of the present disclosure provide a wireless communication method and a terminal device.

In a first aspect, there is provided a wireless communication method, and the method includes:

receiving, by a first terminal device, first information sent by a second terminal device, wherein the first information is used for discovery of a relay device; and making, by the first terminal device, a response to the first information.

In a second aspect, there is provided a wireless communication method, and the method includes:

detecting, by a first terminal device, first information sent by at least one second terminal device, wherein the first information is used for indicating that the second terminal device is capable of being relayed to a network, or the first information is used for indicating information of a relay device to which the second terminal device is capable of being relayed; and making, by the first terminal device, a response to the first information.

In a third aspect, there is provided a wireless communication method, and the method includes:

actively sending, by a second terminal device, first information, wherein the first information is used for indicating that the second terminal device is capable of being relayed to a network, or the first information is used for indicating information of a relay device to which the second terminal device is capable of being relayed.

In a fourth aspect, there is provided a wireless communication method, and the method includes:

detecting, by a remote terminal device, second information sent by at least one first terminal device, wherein the second information is used for indicating discovery of a relay device; and selecting, by the remote terminal device, a relay device according to the second information, and performing relay communication.

In a fifth aspect, there is provided a terminal device, configured to perform the method executed by the first terminal device in the first aspect or any of the implementations thereof.

Specifically, the terminal device includes functional modules configured to perform the method executed by the first terminal device in the first aspect or any of the implementations thereof.

In a sixth aspect, there is provided a terminal device, configured to perform the method executed by the first terminal device in the second aspect or any of the implementations thereof.

Specifically, the terminal device includes functional modules configured to perform the method executed by the first terminal device in the second aspect or any of the implementations thereof.

In a seventh aspect, there is provided a terminal device, configured to perform the method executed by the second terminal device in the third aspect or any of the implementations thereof.

Specifically, the terminal device includes functional modules configured to perform the method executed by the second terminal device in the third aspect or any of the implementations thereof.

In an eighth aspect, there is provided a terminal device, configured to perform the method executed by the remote terminal device in the fourth aspect or any of the implementations thereof.

Specifically, the terminal device includes functional modules configured to perform the method executed by the remote terminal device in the fourth aspect or any of the implementations thereof.

In a ninth aspect, there is provided a terminal device, including a processor and a memory. The memory is configured to store a computer program, and the processor is configured to call and run the computer program stored in the memory to perform the method executed by the first terminal device in the first aspect or any of the implementations thereof.

In a tenth aspect, there is provided a terminal device, including a processor and a memory. The memory is configured to store a computer program, and the processor is configured to call and run the computer program stored in the memory to perform the method executed by the first terminal device in the second aspect or any of the implementations thereof.

In an eleventh aspect, there is provided a terminal device, including a processor and a memory. The memory is configured to store a computer program, and the processor is configured to call and run the computer program stored in the memory to perform the method executed by the second terminal device in the third aspect or any of the implementations thereof.

In a twelfth aspect, there is provided a terminal device, including a processor and a memory. The memory is configured to store a computer program, and the processor is configured to call and run the computer program stored in the memory to perform the method executed by the remote terminal device in the fourth aspect or any of the implementations thereof.

In a thirteenth aspect, there is provided an apparatus, configured to implement the method in any one of the first to fourth aspects or any of the implementations thereof.

Specifically, the apparatus includes: a processor, configured to call and run a computer program from a memory to cause a device installed with the apparatus performs the method in any one of the first to fourth aspects or any of the implementations thereof.

In a fourteenth aspect, there is provided a computer-readable storage medium, configured to store a computer program that causes a computer to perform the method in any one of the first to fourth aspects or any of the implementations thereof.

In a fifteenth aspect, there is provided a computer program product, including computer program instructions, which cause the computer to perform the method in any one of the first to fourth aspects or any of the implementations thereof.

In a sixteenth aspect, there is provided a computer program which, when running on a computer, causes the computer to perform the method in any one of the first to fourth aspects or any of the implementations thereof.

BRIEF DESCRIPTION OF THE DRAWINGS

FIG. 1 is a schematic diagram of a communication system provided by an embodiment of the present disclosure.

FIG. 2 is a schematic diagram of another communication system architecture provided by an embodiment of the present disclosure.

FIG. 3 is a schematic diagram of multi-hop relay provided by an embodiment of the present disclosure.

FIG. 4 is a schematic flowchart of a wireless communication method provided according to an embodiment of the present disclosure.

DETAILED DESCRIPTION

Figures 5, 6:
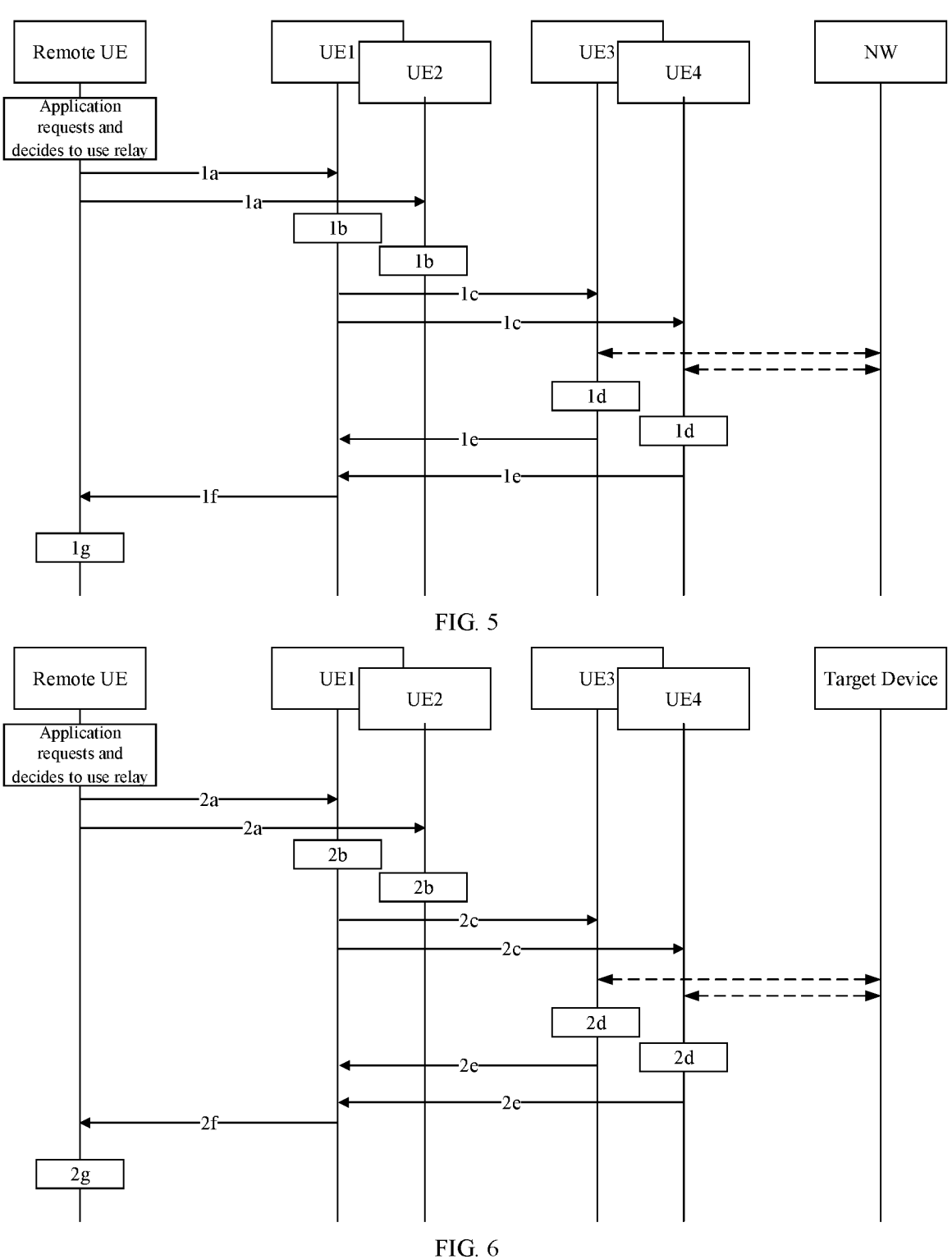
FIG. 5 is a schematic flowchart of a procedure for discovery of a relay device provided according to an embodiment of the present disclosure.
FIG. 6 is schematic flowchart of another procedure for discovery of a relay device provided according to an embodiment of the present disclosure.

The technical solutions in embodiments of the present disclosure will be described below with reference to the accompanying drawings in embodiments of the present disclosure. Obviously, the described embodiments are part of embodiments of the present disclosure, but not all of the embodiments. Based on the embodiments in the present disclosure, all other embodiments derived by a person of ordinary skill in the art without creative efforts shall fall within the protection scope of the present disclosure.

The embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolved NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), a Wireless Fidelity (Wi-Fi), a next-generation of communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), Vehicle to Vehicle (V2V) communication, etc. The embodiments of the present disclosure can also be applied to these communication systems.

Optionally, the communication system according to an embodiment of the present disclosure can be applied to a Carrier Aggregation (CA) scenario, a Dual Connectivity (DC) scenario, and a Standalone (SA) operation scenario.

In the embodiments of the present disclosure, there is no limitation on the frequency spectrum to which they are applied. For example, an embodiment of the present disclosure can be applied to a licensed spectrum or an unlicensed spectrum.

Illustratively, a communication system to which an embodiment of the present disclosure is applied may be a communication system 10 shown in FIG. 2. The communication system 10 may include a network device 11, which may be a device that communicates with a terminal device 12 (or referred to as a communication terminal, or a terminal). The network device 11 may provide communication coverage for a specific geographical area, and may communicate with terminal devices located within the coverage area.

FIG. 1 exemplarily illustrates one network device and two terminal devices. Optionally, the communication system 10 may include multiple network devices, and another number of terminal devices may be included in coverage of each network device, which is not limited in the embodiments of the present disclosure.

Optionally, the communication system 10 may further include other network entities such as a network controller and a mobility management entity, which are not limited in the embodiments of the present disclosure.

It is to be understood that a device with a communication function in the network/system in the embodiments of the present disclosure may be referred to as a communication device. Taking the communication system 10 illustrated in FIG. 1 as an example, the communication device may include the network device 11 and the terminal devices 12 which have the communication function. The network device 11 and the terminal devices 12 may be specific devices as mentioned above, and details are not described herein. The communication device may also include other devices in the communication system 10, for example, other network entities such as a network controller or a mobility management entity, which is not limited in the embodiments of the present disclosure.

Exemplarily, the communication system to which the embodiments of the present disclosure are applied may also be a communication system 20 shown in FIG. 2. As shown in FIG. 2, the communication system 20 includes an Access and Mobility Management Function (AMF) entity 101, a Session Management Function (SMF) entity 102, a Radio Access Network (RAN) 103, an Authentication Server Function (AUSF) entity 104, a Unified Data Management (UDM) entity 105, a Policy Control Function (PCF) entity 106, a Data Network (DN) 107, a User Plane Function (UPF) entity 108, User Equipment (UE) 109, an Application Function (AF) entity 110 and a Network Slice Selection Function (NSSF) entity 111.

The UE 109 is connected with the AMF 101 through a N1 interface, and the UE 109 is connected with the RAN 103 through a Uu interface. The RAN 103 is connected with the AMF 101 through a N2 interface, and the RAN 103 is connected with the UPF 108 through a N3 interface. A plurality of UPFs 108 are connected with each other through N9 interfaces, the UPF 108 is connected with the DN 107 through a N6 interface, and the UPF 108 is also connected with the SMF 102 through a N4 interface. The SMF 102 is connected with the PCF 106 through a N7 interface, the SMF 102 is connected with the UDM 105 through a N10 interface, and the SMF 102 is also connected with the AMF 101 through a N11 interface. A plurality of AMFs 101 are connected with each other through N14 interfaces, the AMF 101 is connected with the UDM 105 through a N8 interface, the AMF 101 is connected with the AUSF 104 through a N12 interface, the AMF 101 is also connected with the PCF 106 through a N15 interface, and the AMF 101 is connected with the NSSF 111 through a N22 interface. The AUSF 104 is connected with the UDM 105 through a N13 interface. The PCF 106 is connected with the AF 110 through a N5 interface. The AMF 101 and the SMF 102 obtain user subscription data from the UDM 105 through N8 and N10 interfaces, respectively, and obtain policy data from the PCF 106 through N15 and N7 interfaces, respectively. The SMF 102 controls the UPF 108 through the N4 interface.

It should be noted that the RAN 103 may include a device that communicates with the UE 109, such as a base station or a base station controller. It should be understood that the RAN 103 can communicate with any number of UEs similar to the UE 109. Each RAN may provide the communication coverage for a specific geographic area, and may communicate with the terminal device (e.g., the UE) located within the coverage area (a cell). The RAN 103 may support communication protocols of different network types, or may support different communication modes. Optionally, the RAN 103 may be an Evolved Node B (eNodeB), a Wireless Fidelity Access Point (Wi-Fi AP), a Worldwide Interoperability for Microwave Access Base Station (WiMAX BS), or a wireless controller in a Cloud Radio Access Network (CRAN), or the network device can be a network device in a 5G network or a network device in a future evolved Public Land Mobile Network (PLMN).

That is, the RAN 103 in the communication system 20 may be the network device 11 in the communication system 10 as shown in FIG. 1.

In the embodiments of the present disclosure, various embodiments are described in combination with the network device and the terminal device.

The terminal device can also be called a User Equipment (UE), an access terminal, a user unit, a user station, a mobile station, a mobile console, a remote station, a remote terminal, a mobile device, a user terminal, a terminal, a wireless communication device, a user agent or a user device, etc. The terminal device can be a station (ST) in WLAN, a cellular phone, a cordless telephone, a Session Initiation Protocol (SIP) telephone, a Wireless Local Loop (WLL) station, a Personal Digital Assistant (PDA) device, a hand-held device with wireless communication function, a computing device or another processing device connected to a wireless modem, a vehicle device, a wearable device and the next generation communication system, for example, a terminal device in NR network or a terminal device in future evolved Public Land Mobile Network (PLMN), etc.

By way of example but not limitation, in the embodiments of the present disclosure, the terminal device may also be a wearable device. The wearable device may also be called a wearable intelligent device, which is a general term for wearable devices developed by applying wearable technology to conduct intelligent design for daily wearings, such as glasses, gloves, watches, clothing and shoes, etc. The wearable device is a portable device which is worn directly on the body or integrated into the user's clothing or accessories. The wearable device is not only a hardware device, but also a device that implements powerful functions through software support, data interaction and cloud interaction. Generalized wearable intelligent devices include devices which are full-featured, are of a large size, and may achieve complete or partial functions without smart phones, such as smart watches or smart glasses, and devices which are only focus on a certain kind of application function, and need to cooperate with other devices such as smart phones, such as various types of smart bracelets and smart jewelry for monitoring physical signs.

The network device may be a device configured to communicate with mobile devices, or may be an Access Point (AP) in WLAN, a base transceiver station (BTS) in GSM or CDMA, a NodeB (NB) in WCDMA, an evolutional node B (eNB or eNodeB) in LTE, a relay station or an access point, a vehicle device, a wearable device, a network device in a NR network (gNB), or a network device in the future evolution PLMN.

In the embodiments of the present disclosure, the network device provides services for a cell, and the terminal devices communicate with the network device through transmission resources (such as frequency domain resources or spectrum resources) used by the cell. The cell may be a cell corresponding to a network device (such as a base station), and the cell may belong to a macro base station or a base station corresponding to a small cell. The small cell here may include: a Metro cell, a Micro cell, a Pico cell, a Femto cell, etc. These small cells have the characteristics of small coverage and low transmission power, which are suitable for providing high-speed data transmission services.

With the continuous development of 5G applications, in order to meet the requirements of applications such as Augmented Reality (AR)/Virtual Reality (VR), games, etc., a new type of service has been proposed, for example, which can be called a Network Controlled Interactive Services (NCIS) service. It is to be noted that this type of new service may be named differently, which is not limited in the present disclosure.

Description will be provided below in an example where this type of new service is the NCIS service.

The NCIS service is mainly aimed at applications such as AR/VR and games, and has high requirements for service quality such as rate, delay, packet loss rate, and high-speed coding and decoding. For example, for VR games, the rate needs to reach 10 Gbps, and the packet loss rate cannot exceed 10E-4. A session established for the NCIS service is an NCIS session, and UEs in the same NCIS session can be considered to form an NCIS group, for example, forming a team in a game.

The UEs in the NCIS group have the following two possible communication manners, which can be used in combination:

1. when the UEs are in proximity to each other, for example, using D2D technologies for broadcast or multicast, or establishing a sidelink (also referred to as using a PC5 interface) for one-to-one communication (unicast);
2. when the UEs are far away from each other, for example, using UE-network-server-equivalent network-equivalent UE (also referred to using the Uu interface or a cellular interface).

The UEs in one NCIS group may come from the same PLMN or different PLMNs. For example, there are five UEs in an NCIS group, three of them are UEs of PLMN 1, and two of them are UEs of PLMN 2, where the three UEs of PLMN 1 communicate directly with each other using the sidelink, and communicate with the other two UEs of PLMN 2 using the network.

For areas with poor coverage, the communication of a remote UE can be implemented using UE-to-network relay to achieve services such as the NCIS, and the system architecture is shown in FIG. 3.

It should be noted that, as shown in FIG. 3, the remote UE is connected to a relay UE through the PC5 interface, and the relay UE is connected to the eNB through the Uu interface, thereby connecting to an Evolved Packet Core (EPC) or 5G core network (5GC). The eNB is connected to an external public safety Internet through the SGi interface.

As shown in FIG. 3, the connection to the network can be realized through multi-hop relay in a relay process, and there may be a plurality of relay UEs.

In single-hop relay, the relay UE can always reside in the network normally, and the remote UE selects an appropriate relay UE according to a relay selection criteria, such as whether a relay service is supported, whether it is in the same PLMN, whether it is in the same RAT, etc.

In the multi-hop relay, since a farther relay UE needs to be connected to the network through a nearer relay UE, whether the farther relay UE can be used as an available relay device depends on whether the farther relay UE can discover and be connect to the nearer relay device. In the multi-hop relay, how to realize the discovery of the relay terminal and the selection of the relay terminal is an urgent problem to be solved.

In view of the above technical problems, the present disclosure provides a relay communication method, which can solve the problems of the discovery of the relay terminal and the selection of the relay terminal in the multi-hop relay.

FIG. 4 is a schematic flowchart of a wireless communication method 200 according to an embodiment of the present disclosure. As shown in FIG. 4, the method 200 may include the following S210 and S220.

In S210, a first terminal device receives first information sent by a second terminal device, where the first information is used for discovery of a relay device.

In S220, the first terminal device makes a response to the first information.

Optionally, the first information may be discovery request information.

Optionally, in an embodiment of the present disclosure, the step S220 may specifically include:

determining, by the first terminal device, whether to perform discovery of a next-hop relay device.

Optionally, as Example 1, the first terminal device is a relay device, the second terminal device is a remote device, there is an application in the second terminal device that needs to perform uplink and downlink communication with a network device, and the second terminal device is configured to establish uplink and downlink communication connection with the network device in a relay transmission manner.

Optionally, in Example 1, the first information includes at least one piece of the following information:

service information to be discovered, group information to be discovered, slicing information to be discovered, Data Network Name (DNN) information, information of the second terminal device, and PLMN information of the second terminal device.

Optionally, in Example 1, the determining, by the first terminal device, whether to perform the discovery of the next-hop relay device includes at least one of the following:

determining, by the first terminal device, whether to perform the discovery of the next-hop relay device according to whether the first terminal device is within coverage of the network;

determining, by the first terminal device, whether to perform the discovery of the next-hop relay device according to whether the first terminal device supports content of the first information;

determining, by the first terminal device, whether to perform the discovery of the next-hop relay device according to whether the first terminal device is in a PLMN of the second terminal device;

determining, by the first terminal device, whether to perform the discovery of the next-hop relay device according to setting information of the first terminal device; and determining, by the first terminal device, whether to perform the discovery of the next-hop relay device according to a relationship between the first terminal device and the second terminal device.

Optionally, as Example 2, the first terminal device is the relay device, the first terminal device is the next-hop relay device of the second terminal device, a third terminal device is the remote device, and the third terminal device can be directly relayed to the second terminal device or can be relayed to the second terminal device through other relay devices. There is an application in the third terminal device that needs to perform the uplink and downlink communication with the network.

Optionally, in Example 2, the first information includes at least one piece of the following information:

service information to be discovered, group information to be discovered, slicing information to be discovered, DNN information, information of the second terminal device, PLMN information of the second terminal device, information of a group to which the second terminal device belongs, information of the third terminal device, and PLMN information of the third terminal device.

Optionally, in Example 2, the determining, by the first terminal device, whether to perform the discovery of the next-hop relay device includes at least one of the following:

determining, by the first terminal device, whether to perform the discovery of the next-hop relay device according to whether the first terminal device is within coverage of the network;

determining, by the first terminal device, whether to perform the discovery of the next-hop relay device according to whether the first terminal device supports content of the first information;

determining, by the first terminal device, whether to perform the discovery of the next-hop relay device according to whether the first terminal device is in a PLMN of the second terminal device;

determining, by the first terminal device, whether to perform the discovery of the next-hop relay device according to whether the first terminal device is in a PLMN of the third terminal device;

determining, by the first terminal device, whether to perform the discovery of the next-hop relay device according to setting information of the first terminal device;

determining, by the first terminal device, whether to perform the discovery of the next-hop relay device according to a relationship between the first terminal device and the second terminal device; and determining, by the first terminal device, whether to perform the discovery of the next-hop relay device according to a relationship between the first terminal device and the third terminal device.

Optionally, as Example 3, the first terminal device is the relay device, the second terminal device is the remote device, and there is an application in the second terminal device that needs to perform a sidelink communication with a target device. The second terminal device needs to be able to discover the target device to which the relay device is finally connected, and the second terminal device is configured to establish sidelink communication connection with the target device in the relay transmission manner.

Optionally, in Example 3, the first information includes at least one piece of the following information:

information of the target device, service information to be discovered, group information to be discovered, slicing information to be discovered, DNN information, information of the second terminal device, PLMN information of the target device, and PLMN information of the second terminal device.

Optionally, in Example 3, the determining, by the first terminal device, whether to perform the discovery of the next-hop relay device includes at least one of the following:

determining, by the first terminal device, whether to perform the discovery of the next-hop relay device according to whether the first terminal device supports content of the first information;

determining, by the first terminal device, whether to perform the discovery of the next-hop relay device according to whether the first terminal device is in a PLMN of the second terminal device;

determining, by the first terminal device, whether to perform the discovery of the next-hop relay device according to setting information of the first terminal device;

determining, by the first terminal device, whether to perform the discovery of the next-hop relay device according to a relationship between the first terminal device and the second terminal device;

determining, by the first terminal device, whether to perform the discovery of the next-hop relay device according to whether the target device has been discovered;

determining, by the first terminal device, whether to perform the discovery of the next-hop relay device according to a relationship between the first terminal device and the target device;

determining, by the first terminal device, whether to perform the discovery of the next-hop relay device according to whether the first terminal device matches the PLMN information of the target device; and determining, by the first terminal device, whether to perform the discovery of the next-hop relay device according to whether the first terminal device is in the same group as the target device.

Optionally, as Example 4, the first terminal device is the relay device, the first terminal device is the next-hop relay device of the second terminal device, and the third terminal device is the remote device and can be directly relayed to the second terminal device or can be relayed to the second terminal device through other relay devices. The third terminal device needs to be able to discover the target device to which the relay device is finally connected, and there is an application in the third terminal device that needs to perform the sidelink communication with the target device.

Optionally, in Example 4, the first information includes at least one piece of the following information:

information of the target device, service information to be discovered, group information to be discovered, slicing information to be discovered, DNN information, PLMN information of the target device, information of the second terminal device, PLMN information of the second terminal device, information of a group to which the second terminal device belongs, information of a third terminal device, and PLMN information of the third terminal device.

Optionally, in Example 4, the determining, by the first terminal device, whether to perform the discovery of the next-hop relay device includes at least one of the following:

determining, by the first terminal device, whether to perform the discovery of the next-hop relay device according to whether the first terminal device supports content of the first information;

determining, by the first terminal device, whether to perform the discovery of the next-hop relay device according to whether the first terminal device is in a PLMN of the second terminal device;

determining, by the first terminal device, whether to perform the discovery of the next-hop relay device according to whether the first terminal device is in a PLMN of the third terminal device;

determining, by the first terminal device, whether to perform the discovery of the next-hop relay device according to setting information of the first terminal device;

determining, by the first terminal device, whether to perform the discovery of the next-hop relay device according to a relationship between the first terminal device and the second terminal device;

determining, by the first terminal device, whether to perform the discovery of the next-hop relay device according to whether the target device has been discovered;

determining, by the first terminal device, whether to perform the discovery of the next-hop relay device according to a relationship between the first terminal device and the target device;

determining, by the first terminal device, whether to perform the discovery of the next-hop relay device according to a relationship between the first terminal device and the third terminal device;

determining, by the first terminal device, whether to perform the discovery of the next-hop relay device according to whether the first terminal device matches the PLMN information of the target device; and determining, by the first terminal device, whether to perform the discovery of the next-hop relay device according to whether the first terminal device is in the same group as the target device.

Optionally, in the above Example 1 or Example 2, if the first terminal device is within the coverage of the network, the first terminal device determines not to perform the discovery of the next-hop relay device; or, if the first terminal device is not within the coverage of the network, the first terminal device determines to perform the discovery of the next-hop relay device.

Optionally, in any of the above Examples 1 to 4, the first terminal device determines to perform the discovery of the next-hop relay device in at least one of the following situations where:

the first terminal device is in a group indicated by the group information to be discovered, the first terminal device supports the slicing information to be discovered and/or the DNN information, and the service information to be discovered is not prohibited; and the first terminal device determines not to perform the discovery of the next-hop relay device in at least one of the following situations where:

the first terminal device is not in the group indicated by the group information to be discovered, the first terminal device does not support the slicing information to be discovered or the DNN information, and the service information to be discovered is prohibited.

Optionally, in any of the above Examples 1 to 4, the first terminal device determines to perform the discovery of the next-hop relay device in at least one of the following situations where:

a PLMN where the first terminal device resides belongs to the PLMN information of the second terminal device, a home PLMN of the first terminal device belongs to the PLMN information of the second terminal device, and an equivalent PLMN of the first terminal device belongs to the PLMN information of the second terminal device; and the first terminal device determines not to perform the discovery of the next-hop relay device in at least one of the following situations where:

the PLMN where the first terminal device resides does not belong to the PLMN information of the second terminal device, the home PLMN of the first terminal device does not belong to the PLMN information of the second terminal device, and the equivalent PLMN of the first terminal device does not belong to the PLMN information of the second terminal device.

Optionally, in any of the above Examples 1 to 4, if the setting information of the first terminal device is that the first terminal device is allowed to function as the relay device, the first terminal device determines to perform the discovery of the next-hop relay device; or, if the setting information of the first terminal device is that the first terminal device is not allowed to function as the relay device, the first terminal device determines not to perform the discovery of the next-hop relay device.

Optionally, the setting information of the first terminal device is set by the network device, or the setting information of the first terminal device is obtained from subscription information, or the setting information of the first terminal device is set by a user.

Optionally, in any of the above Examples 1 to 4, if the information of the second terminal device is included in configuration information of the first terminal device, the first terminal device determines to perform the discovery of the next-hop relay device; or, if the information of the second terminal device is not included in the configuration information of the first terminal device, the first terminal device determines not to perform the discovery of the next-hop relay device.

Optionally, in the above Example 3 or Example 4, if the target device has been discovered, the first terminal device determines not to perform the discovery of the next-hop relay device; or, if the target device is not discovered, the first terminal device determines to perform the discovery of the next-hop relay device.

Optionally, in the above Example 3 or Example 4, if the information of the target device is included in the configuration information of the first terminal device, the first terminal device determines to perform the discovery of the next-hop relay device; or, if the information of the target device is not included in the configuration information of the first terminal device, the first terminal device determines not to perform the discovery of the next-hop relay device.

Optionally, in the above Example 3 or Example 4, the first terminal device determines to perform the discovery of the next-hop relay device in at least one of the following situations where:

a PLMN with which the first terminal device is registered belongs to the PLMN information of the target device, a home PLMN of the first terminal device belongs to the PLMN information of the target device, and an equivalent PLMN of the first terminal device belongs to the PLMN information of the target device; and the first terminal device determines not to perform the discovery of the next-hop relay device in at least one of the following situations where:

the PLMN with which the first terminal device is registered does not belong to the PLMN information of the target device, the home PLMN of the first terminal device does not belong to the PLMN information of the target device, and the equivalent PLMN of the first terminal device does not belong to the PLMN information of the target device.

Optionally, in the above Example 3 or Example 4, if the first terminal device is in the same group as the target device, the first terminal device determines to perform the discovery of the next-hop relay device; or, if the first terminal device is in a different group from the target device, the first terminal device determines not to perform the discovery of the next-hop relay device.

Optionally, in the above Example 2 or Example 4, the first terminal device determines to perform the discovery of the next-hop relay device in at least one of the following situations where:

a PLMN where the first terminal device resides belongs to the PLMN information of the third terminal device, a home PLMN of the first terminal device belongs to the PLMN information of the third terminal device, and an equivalent PLMN of the first terminal device belongs to the PLMN information of the third terminal device; and the first terminal device determines not to perform the discovery of the next-hop relay device in at least one of the following situations where:

the PLMN where the first terminal device resides does not belong to the PLMN information of the third terminal device, the home PLMN of the first terminal device does not belong to the PLMN information of the third terminal device, and the equivalent PLMN of the first terminal device does not belong to the PLMN information of the third terminal device.

Optionally, in the above Example 2 or Example 4, if the information of the third terminal device is included in the configuration information of the first terminal device, the first terminal device determines to perform the discovery of the next-hop relay device; or, if the information of the third terminal device is not included in the configuration information of the first terminal device, the first terminal device determines not to perform the discovery of the next-hop relay device.

Optionally, the configuration information of the first terminal device is configured by the network device, or the configuration information of the first terminal device is obtained from the subscription information, or the configuration information of the first terminal device is configured by the first terminal device.

Optionally, in the above Example 1 or Example 2, the second terminal device is a device that initially sends information for the discovery of the relay device.

Optionally, in the above Example 3 or Example 4, the second terminal device is another relay device other than the relay device.

Optionally, in the embodiments of the present disclosure, the first information includes information on a hop count for the second terminal device in the relay transmission.

Further, the first terminal device updates the hop count information; if the updated hop count is greater than or equal to a first threshold, or the hop count for the second terminal device in the relay transmission is greater than or equal to the first threshold, the first terminal device determines not to perform the discovery of the next-hop relay device; or, if the updated hop count is less than the first threshold, or the hop count for the second terminal device in the relay transmission is less than the first threshold, the first terminal device determines to perform the discovery of the next-hop relay device.

Optionally, the first threshold is set by the network device, or the first threshold is configured according to the subscription information, or the first threshold is configured by the first terminal device, or, the first threshold is carried in the first information.

Optionally, in the embodiments of the present disclosure, if the first terminal device determines to perform the discovery of the next-hop relay device, the first terminal device sends second information for the discovery of the relay device to a fourth terminal device, and the second information includes the content of the first information; and the second information further includes at least one piece of the following information:

information of the first terminal device, PLMN information of the first terminal device, and information of a group to which the first terminal device belongs.

Optionally, the second information further includes information on a hop count for the first terminal device in the relay transmission.

Optionally, the second information further includes a first threshold, and the first threshold is used for the fourth terminal device to determine whether to perform the discovery of the next-hop relay device in conjunction with the information on the hop count for the first terminal device in the relay transmission.

Optionally, in the embodiments of the present disclosure, the first terminal device starts a first timer; and if no device is connected to the first terminal device when the first timer expires, the first terminal device stops sending the second information.

For example, when sending the second information, the first terminal device starts the first timer.

Optionally, in the embodiments of the present disclosure, if no device is connected to the first terminal device, the first terminal device stops sending the second information.

Specifically, if no device is connected to the first terminal device, the first terminal device starts the first timer; and if no device is connected to the first terminal device when the first timer expires, the first terminal device stops sending the second information.

Optionally, in the embodiments of the present disclosure, the first terminal device receives response information for the second information sent by the fourth terminal device; and the first terminal device forwards the response information to the second terminal device.

Optionally, the response information is used for indicating that the next-hop relay device has been discovered.

In a case where the response information is used for indicating that the next-hop relay device has been discovered, the response information includes at least one piece of the following information:

service information supported by the next-hop relay device, information of a group to which the next-hop relay device belongs, slicing information supported by the next-hop relay device, DNN information supported by the next-hop relay device, and PLMN information of the next-hop relay device.

Optionally, the response information is used for indicating that the next-hop relay device is not discovered.

Optionally, in the embodiments of the present disclosure, the first terminal device selects, among at least one relay device, one or more relay devices with a minimum hop count as the next-hop relay device; or, the first terminal device selects, among the at least one relay device, a relay device with a hop count within a first range as the next-hop relay device.

Therefore, in the embodiments of the present disclosure, the first terminal device can respond to the first information for the discovery of the relay device based on actual needs. Furthermore, the first terminal device can determine whether to perform the discovery of the next-hop relay device based on the actual needs, which saves the power consumption of periodic monitoring of the relay device and sending of the discovery request message and the discovery response message.

A wireless communication method 200 provided by the embodiments of the present disclosure is described in detail below with reference to specific embodiments.

Optionally, as Embodiment 1, as shown in FIG. 5, the remote UE has an application that needs to perform the uplink and downlink communication with the network, and the remote UE decides to adopt the relay transmission manner. Optionally, the remote UE may be the second terminal device in the above Example 1, and UE 1 and UE 2 may be the first terminal device in the above Example 1; or, the remote UE may be the third terminal device in the above Example 2, UE 1 and UE 2 may be the second terminal device in the above Example 2, and UE 3 and UE 4 may be the first terminal device in the above Example 2. Specifically, the remote UE can implement the multi-hop relay communication through the following steps 1a to 1g.

In the 1a, the remote UE sends a discovery request message 1. For example, as shown in FIG. 5, the remote UE sends the discovery request message 1 to UE 1 and UE 2 respectively.

Optionally, the discovery request message 1 may carry at least one piece of the following information:

service information to be discovered, group information to be discovered, slicing information to be discovered, DNN information, information of the remote UE, and PLMN information of the remote UE.

It should be noted that the service information to be discovered may be the NCIS service or other services. The group information to be discovered may be an NCIS group or other terminal groups.

It should be understood that multiple UEs having the same NCIS session form an NCIS group.

Optionally, the information of the remote UE is identity information of the remote UE.

Optionally, the PLMN information of the remote UE includes at least one of the following:

a serving PLMN of the remote UE, a home PLMN of the remote UE, an equivalent PLMN of the remote UE, and a list of equivalent PLMNs of the remote UE.

In the 1b, after receiving the discovery request message 1, UE 1 and UE 2 decide whether to perform the discovery of the next-hop relay device.

Specifically, UE 1 and UE 2 can decide whether to perform the discovery of the next-hop relay device based on the following decision conditions:

1) whether it is within coverage of the network. If it is within the coverage of the network, the discovery of the next-hop relay device is no longer performed, and if it is not within the coverage of the network, the discovery of the next-hop relay device is performed.

2) whether it supports or allows the content carried in the discovery request message 1. For example, if UE 1 is in the group indicated by the group information to be discovered, and/or if UE 1 supports the slicing information to be discovered and/or the DNN information, and/or if the service information to be discovered is not prohibited, UE 1 determines to perform the discovery of the next-hop relay device; or, if UE 1 is not in the group indicated by the group information to be discovered, and/or if UE 1 does not support the slicing information to be discovered or the DNN information, and/or if the service information to be discovered is prohibited, the UE 1 determines not to perform the discovery of the next-hop relay device. UE 1 is only illustrated for example, and it also applied to UE 2.

3) whether it is in the PLMN of the remote UE. The discovery request message 1 carries the PLMN information of the remote UE, which may be HPLMN information or ePLMN information. For example, if a PLMN where UE 1 resides or a HPLMN of UE 1 or an ePLMN of UE 1 belongs to the PLMN information of the remote UE carried in the discovery request message 1, the discovery of the next-hop relay device is performed; otherwise, the discovery of the next-hop relay device is not performed. UE 1 is only illustrated for example, and it also applied to UE 2.

4) based on the setting information of the terminal. For example, if the setting information of UE 1 is that the UE 1 is allowed to function as the relay device, UE 1 determines to perform the discovery of the next-hop relay device; or, if the setting information of UE 1 is that the UE 1 is not allowed to function as the relay device, UE 1 determines not to perform the discovery of the next-hop relay device. UE 1 is only illustrated for example, and it also applied to UE 2.

Optionally, the setting information may be from a network side, or from the subscription information, or from the setting by the user.

5) based on a relationship with the remote UE. For example, if the information of the remote UE is included in the configuration information of UE 1, UE 1 determines to perform the discovery of the next-hop relay device; or, if the information of the remote UE is not included in the configuration information of UE 1, UE 1 determines not to perform the discovery of the next hop relay device. UE 1 is only illustrated for example, and it also applied to UE 2.

Optionally, the configuration information may be configured by the network side, or locally configured by the terminal, or configured based on the subscription information.

As shown in FIG. 5, UE 1 decides to perform the discovery of the next-hop relay device, while UE 2 decides not to perform the discovery of the next-hop relay device. That is, UE2 ignores the discovery request message 1 received.

In the 1c. UE 1 sends a discovery request message 2 to UE 3 and UE 4.

Optionally, the discovery request message 2 sent by UE 1 carries the following information:

1) the information of the remote UE in the discovery request message 1;

2) identity information of UE 1; and 3) network information of UE 1, such as HPLMN information, ePLMN information, information of a group to which UE 1 belongs, etc.

In the 1d, after UE 3 and UE 4 receive the discovery request message 2 sent by UE 1, UE 3 and UE 4 can decide whether to perform the discovery of the next-hop relay device based on the following decision conditions:

1) conditions same as those in the step 1b.

2) whether it is in the PLMN of the remote UE or UE 1. The discovery request message 2 carries the PLMN information of the remote UE and UE 1, which can be the HPLMN information or the ePLMN information. If the PLMN with which UE 3 is registered, the HPLMN of UE 3, or the ePLMN of UE 3 belongs to the PLMN information of the remote UE and/or the PLMN information of UE 1 in the discovery request message 2, the discovery of the next-hop relay device is performed. Alternatively, if the PLMN with which UE 3 is registered, the HPLMN of UE 3, or the ePLMN of UE 3 is the same as the PLMN information of the remote UE or belongs to the PLMN of the remote UE, the discovery of the next-hop relay device is performed. Alternatively, if the PLMN with which UE 3 is registered, the HPLMN of UE 3, or the ePLMN of UE 3 is the same as the PLMN information of UE1 or belongs to the PLMN of UE1, the discovery of the next-hop relay device is performed. UE 3 is only illustrated for example, and it also applied to UE 4.

4) based on the setting information of the terminal. For example, if the setting information of UE 3 is that the UE 3 is allowed to function as the relay device, UE 3 determines to perform the discovery of the next-hop relay device; or, if the setting information of UE 3 is that the UE 3 is not allowed to function as the relay device, UE 3 determines not to perform the discovery of the next-hop relay device. UE 3 is only illustrated for example, and it also applied to UE 4.

5) based on a relationship with the remote UE or UE 1. According to the information of the remote UE and the information of UE 1 for example, the identity information of the remote UE and the identity information of UE 1, carried in the discovery request message 2. If the identity information of the remote UE and/or UE 1 is included in the configuration information of UE 3, the discovery of the next-hop relay device is performed. Otherwise, the discovery of the next-hop relay device is not performed. The configuration information may be configured by the network side, or locally configured by the UE 3, or configured based on the subscription information. UE 3 is only illustrated for example, and it also applied to UE 4.

Optionally, if UE 3 and/or UE 4 determines to perform the discovery of the next-hop relay device, the discovery of the next-hop relay device is performed.

As shown in FIG. 5, UE 3 and UE 4 are the last-hop relay device, and a discovery response message is returned to a previous-hop relay device. That is to say, UE 3 and UE 4 are already able to be relayed to the network (NW).

In the 1e, UE 3 and UE 4 each sends a discovery response message 1 to UE 1, and the discovery response message 1 carries the service information, the group information, the slicing information, the DNN information, etc. requested by the previous-hop relay device and/or the remote UE that can be supported or allowed.

In the 1f, the UE 1 sends a discovery response message 2 to the remote UE, and the discovery response message 2 carries the supported information fed back by UE 3 and UE 4.

In the 1g, the remote UE selects an appropriate relay device according to the discovery response message 2 received.

Optionally, in Embodiment 1, when selecting the next-hop relay device, the remote UE and an intermediate relay device preferentially select the relay device with the minimum hop count.

Optionally, as Embodiment 2, as shown in FIG. 6, the remote UE can discover the target device to which the relay device is finally connected. The remote UE has an application that needs to perform the sidelink communication with the target device, and the remote UE decides to adopt the relay transmission manner. Optionally, the remote UE may be the second terminal device in the above Example 3, and UE 1 and UE 2 may be the first terminal device in the above Example 3; or, the remote UE may be the third terminal device in the above Example 4, UE 1 and UE 2 may be the second terminal device in the above Example 4, and UE 3 and UE 4 may be the first terminal device in the above Example 4. Specifically, the remote UE can implement the multi-hop relay communication through the following steps 2a to 2g.

In the 2a, the remote UE sends a discovery request message 1. For example, as shown in FIG. 6, the remote UE sends the discovery request message 1 to UE 1 and UE 2 respectively.

Optionally, the discovery request message 1 may carry at least one piece of the following information:

service information to be discovered, group information to be discovered, slicing information to be discovered, DNN information, information of the remote UE, PLMN information of the remote UE, information of the target device, and PLMN information of the target device.

It should be noted that the service information to be discovered may be the NCIS service or other services. The group information to be discovered may be an NCIS group or other terminal groups.

It should be understood that multiple UEs having the same NCIS session form an NCIS group.

Optionally, the information of the remote UE is identity information of the remote UE. The information of the target device is identity information of the target device.

Optionally, the PLMN information of the remote UE includes at least one of the following:

a serving PLMN of the remote UE, a home PLMN of the remote UE, an equivalent PLMN of the remote UE, and a list of equivalent PLMNs of the remote UE.

Optionally, the PLMN information of the target device includes at least one of the following:

a serving PLMN of the target device, a home PLMN of the target device, an equivalent PLMN of the target device, and a list of equivalent PLMNs of the target device.

In the 2b, after receiving the discovery request message 1, UE 1 and UE 2 decide whether to perform the discovery of the next-hop relay device.

Specifically, UE 1 and UE 2 can decide whether to perform the discovery of the next-hop relay device based on the following decision conditions:

1) whether the target device has been discovered. If the target device has been discovered, the discovery procedure for the next-hop relay device is not initiated.

2) whether the content carried in the discovery request message 1 is supported or allowed. For example, if UE 1 is in the group indicated by the group information to be discovered, and/or UE 1 supports the slicing information to be discovered and/or the DNN information, and/or the service information to be discovered is not prohibited, UE 1 determines to perform the discovery of the next-hop relay device; or, if UE 1 is not in the group indicated by the group information to be discovered, and/or UE 1 does not support the slicing information to be discovered or the DNN information, and/or the service information to be discovered is prohibited, UE 1 determines not to perform the discovery of the next-hop relay device. UE 1 is only illustrated for example, and it also applied to UE 2.

3) whether it is in the PLMN of the remote UE. The discovery request message 1 carries the PLMN information of the remote UE, which may be HPLMN information or ePLMN information. For example, if a PLMN where UE 1 resides, a HPLMN of UE 1, or an ePLMN of UE 1 belongs to the PLMN information of the remote UE carried in the discovery request message 1, the discovery of the next-hop relay device is performed; or if the PLMN with which UE1 is registered, the HPLMN, or the ePLMN is the same as the PLMN information of the remote UE or belongs to the PLMN of the remote UE, the discovery of the next-hop relay device is performed; otherwise, the discovery of the next-hop relay device is not performed. UE 1 is only illustrated for example, and it also applied to UE 2.

4) based on the setting information of the terminal. For example, if the setting information of UE 1 is that the UE 1 is allowed to function as the relay device, UE 1 determines to perform the discovery of the next-hop relay device; or, if the setting information of UE 1 is that the UE 1 is not allowed to function as the relay device, UE 1 determines not to perform the discovery of the next-hop relay device. UE 1 is only illustrated for example, and it also applied to UE 2.

Optionally, the setting information may be from a network side, or from the subscription information, or from the setting by the user.

5) based on a relationship with the remote UE. For example, if the information of the remote UE is included in the configuration information of UE 1, UE 1 determines to perform the discovery of the next-hop relay device; or, if the information of the remote UE is not included in the configuration information of UE 1, UE 1 determines not to perform the discovery of the next hop relay device. UE 1 is only illustrated for example, and it also applied to UE 2.

Optionally, the configuration information may be configured by the network side, or locally configured by the terminal, or configured based on the subscription information.

6) whether it is in the PLMN of the target device. The discovery request message 1 carries the PLMN information of the target device, which may be the HPLMN information or the ePLMN information. For example, if the PLMN where UE 1 resides, the HPLMN of UE 1, or the ePLMN of UE 1 belongs to the PLMN information of the target device carried in the discovery request message 1, the discovery of the next-hop relay device is performed. Alternatively, if the PLMN with which UE 1 is registered, the HPLMN, or the ePLMN is the same as the PLMN information of the target device or belongs to the PLMN of the target device, the discovery of the next-hop relay device is performed; otherwise, the discovery of the next-hop relay device is not performed. UE 1 is only illustrated for example, and it also applied to UE 2.

7) based on a relationship with the target device. For example, if the information of the target device is included in the configuration information of UE 1, UE 1 determines to perform the discovery of the next-hop relay device; or, if the information of the target device is not included in the configuration information of UE 1, UE 1 determines not to perform the discovery of the next-hop relay device. UE 1 is only illustrated for example, and it also applied to UE 2.

Optionally, the configuration information may be configured by the network side, or locally configured by the terminal, or configured based on the subscription information.

8) whether it is in the same group as the target device. For example, if UE 1 is in the same group as the target device, UE 1 determines to perform the discovery of the next-hop relay device; or, if UE 1 is not in the same group as the target device, UE 1 determines not to perform the discovery of the next-hop relay device. UE 1 is only illustrated for example, and it also applied to UE 2.

Further, hop count information may be carried in the discovery request message. For example, if a hop count in the discovery request message 1 sent by the remote UE to UE 1 is 0, it indicates that there is no relay device before, or if the hop count is 1, it means that it is currently the first hop. When UE 1 sends a discovery request message for the next-hop relay device, the hop count is incremented by 1 and carried in the discovery request message. There is a threshold for the maximum hop count in the relay device. When the hop count in the discovery request message received by the n-th UE reaches or exceeds the threshold, the discovery of the next-hop relay device is no longer performed, or when the received hop count plus 1 reaches or exceeds the threshold, the discovery of the next-hop relay device is no longer performed. The threshold for the maximum hop count can be configured locally in the terminal, or configured for the terminal by the network, or carried in the discovery request message by the remote UE, and is carried in the discovery request message for each of the subsequent hop relay devices.

As shown in FIG. 6, UE 1 decides to perform the discovery of the next-hop relay device, while UE 2 decides not to perform the discovery of the next-hop relay device. That is, UE2 ignores the received discovery request message 1.

In the 2c, UE 1 sends a discovery request message 2 to UE 3 and UE 4.

Optionally, the discovery request message 2 sent by UE 1 carries the following information:

1) the information of the remote UE in the discovery request message 1;

2) identity information of UE 1;

3) network information of UE 1, such as HPLMN information, ePLMN information, information of a group to which UE 1 belongs, etc.

In the 2d, after UE 3 and UE 4 receive the discovery request message 2 sent by UE 1, UE 3 and UE 4 can decide whether to perform the discovery of the next-hop relay device based on the following decision conditions:

1) conditions same as those in the step 1b.

2) whether it is in the PLMN of the remote UE or UE 1. The discovery request message 2 carries the PLMN information of the remote UE and UE 1, which can be the HPLMN information or the ePLMN information. If the PLMN with which UE 3 is registered, the HPLMN of UE 3, or the ePLMN of UE 3 belongs to the PLMN information of the remote UE and/or the PLMN information of UE 1 in the discovery request message 2, the discovery of the next-hop relay device is performed. Alternatively, if the PLMN with which UE 3 is registered, the HPLMN of UE 3, or the ePLMN of UE 3 is the same as the PLMN information of the remote UE or belongs to the PLMN of the remote UE, the discovery of the next-hop relay device is performed. Alternatively, if the PLMN with which UE 3 is registered, the HPLMN of UE 3, or the ePLMN of UE 3 is the same as the PLMN information of UE1 or belongs to the PLMN of UE1, the discovery of the next-hop relay device is performed. UE 3 is only illustrated for example, and it also applied to UE 4.

4) based on the setting information of the terminal. For example, if the setting information of UE 3 is that the UE 3 is allowed to function as the relay device, UE 3 determines to perform the discovery of the next-hop relay device; or, if the setting information of UE 3 is that the UE 3 is not allowed to function as the relay device, UE 3 determines not to perform the discovery of the next-hop relay device. UE 3 is only illustrated for example, and it also applied to UE 4.

5) based on a relationship with the remote UE or UE 1. According to the information of the remote UE and the information of the UE 1 carried in the discovery request message 2, for example, the identity information, if the identity information of the remote UE and/or UE 1 is included in the configuration information of UE 3, the discovery of the next-hop relay device is performed, otherwise, the discovery of the next-hop relay device is not performed. The configuration information may be configured by the network side, or locally configured by the UE 3, or configured based on the subscription information. UE 3 is only illustrated for example, and it also applied to UE 4.

Optionally, if UE 3 and/or UE 4 determines to perform the discovery of the next-hop relay device, the discovery of the next-hop relay device is performed.

As shown in FIG. 6, UE 3 and UE 4 are already the last-hop relay device, and a discovery response message is returned to a previous-hop relay device. That is to say, UE 3 and UE 4 are already able to be relayed to the target device.

In the 2e, UE 3 and UE 4 each sends a discovery response message 1 to UE 1, and the discovery response message 1 carries the service information, the group information, the slicing information, the DNN information, etc. requested by the previous-hop relay device and/or the remote UE that can be supported or allowed.

It should be noted that the discovery response message for each hop carries the information of all relay devices, or only carries the information of the remote UE and the information of the target device. Further, the hop count information is carried in discovery response message for each hop, and each relay device adds 1 to the received hop count and carries it in the discovery response message sent by itself.

In the 2f, UE 1 sends a discovery response message 2 to the remote UE, and the discovery response message 2 carries the supported information fed back by UE 3 and UE 4.

In the 2g, the remote UE selects an appropriate relay device according to the received discovery response message 2.

Optionally, in Embodiment 2, when selecting the next-hop relay device, the remote UE and an intermediate relay device preferentially select the relay device with the minimum hop count.

In the schemes of Embodiment 1 and Embodiment 2 above, the relay node can be discovered by means of triggering, and the discovery request message can be sent based on actual needs, which saves the power consumed by periodic monitoring of the relay device and sending of the discovery request message.

Therefore, in the schemes of Embodiment 1 and Embodiment 2 above, the relay device can determine whether to perform the discovery of the next-hop relay device based on the actual needs, which saves the power consumption of the periodic monitoring of the relay device and avoids the unnecessary power consumption caused by the sending of the discovery request message and the discovery response message.

Figure 7:
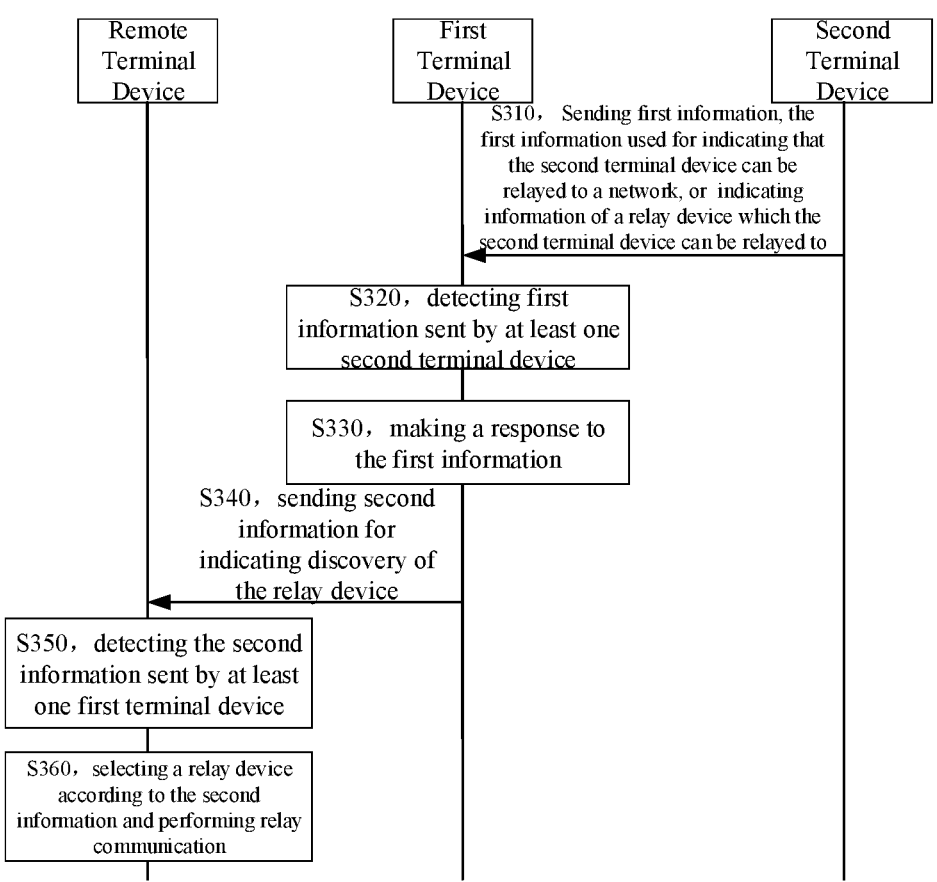
FIG. 7 is a schematic flowchart of another wireless communication method provided according to an embodiment of the present disclosure.

FIG. 7 is a schematic flowchart of a wireless communication method 300 according to an embodiment of the present disclosure. As shown in FIG. 7, the method 300 may include the following contents:

in S310, a second terminal device actively sends first information, where the first information is used for indicating that the second terminal device can be relayed to a network, or the first information is used for indicating information of a relay device to which the second terminal device can be relayed to;

in S320, a first terminal device detects the first information sent by at least one second terminal device;

in S330, the first terminal device makes a response to the first information;

in S340, the first terminal device sends second information for indicating discovery of the relay device;

in S350, a remote terminal device detects the second information sent by at least one first terminal device; and in S360, the remote terminal device selects the relay device according to the second information, and performs relay communication.

It should be noted that, the second terminal device actively sends the first information without being triggered by information such as the discovery request message.

Optionally, the second terminal device may actively send the first information in a broadcast manner. That is, the second terminal device actively sends the first information to all relay devices within a certain range.

Optionally, the first information and/or the second information may be the discovery information message.

Optionally, in the embodiments of the present disclosure, if the second terminal device determines that the first information needs to be updated, the second terminal device sends first indication information for the first information, and the first indication information is used for indicating the first terminal device to update part or all of content of the first information or to add content to the first information.

Optionally, the first indication information is specifically used for indicating the first terminal device to modify or delete part or all of the content of the first information, or add content to the first information.

Optionally, the first terminal device detects the first indication information for the first information sent by the second terminal device, and the first terminal device updates part or all of the content of the first information according to the first indication information.

Specifically, the first terminal device modifies or deletes part or all of the content of the first information, or add content to the first information according to the first indication information.

Optionally, in the embodiments of the present disclosure, the step S330 may specifically include:

determining, by the first terminal device, whether to carry the content of the first information in the second information used for indicating to the discovery of the relay device.

Optionally, as Example a, the first information is used for indicating that the second terminal device can be relayed to the network.

Optionally, in Example a, in a case where the second terminal device is within coverage of network and has been registered with the network, the second terminal device actively sends the first information.

Optionally, in Example a, the first information includes at least one piece of the following information:

service information supported by the second terminal device, information of a group to which the second terminal device belongs, slicing information supported by the second terminal device, DNN information supported by the second terminal device, and PLMN information of the second terminal device.

Optionally, the PLMN information of the second terminal device includes at least one of the following:

a serving PLMN of the second terminal device, a home PLMN (HPLMN) of the second terminal device, an equivalent PLMN (ePLMN) of the second terminal device, and a list of equivalent PLMNs of the second terminal device.

Optionally, in Example a, the first terminal device detects third information sent by a third terminal device, and the third information is used for indicating that the third terminal device can be relayed to the network; and the first terminal device determines whether to carry the content of the first information and/or the third information in the second information.

Optionally, the third information includes at least one piece of the following information:

service information supported by the third terminal device, information of a group to which the third terminal device belongs, slicing information supported by the third terminal device, DNN information supported by the third terminal device, and PLMN information of the third terminal device.

Optionally, the PLMN information of the third terminal device includes at least one of the following:

a serving PLMN of the third terminal device, a home PLMN of the third terminal device, an equivalent PLMN of the third terminal device, and a list of equivalent PLMNs of the third terminal device.

Optionally, in Example a, the first terminal device detects second indication information for the third information sent by the third terminal device; and the first terminal device updates part or all of the content of the third information according to the second indication information.

Optionally, the first terminal device adds content to the third information, or modifies or deletes part or all of the content of the third information according to the second indication information.

Optionally, in Example a, the determining, by the first terminal device, whether to carry the content of the first information and/or the third information in the second information may specifically include one of the following:

determining, by the first terminal device, to carry all of the content of the first information and the third information in the second information;

determining, by the first terminal device, to carry information sent by a relay device that matches the PLMN of the first terminal device in the second information;

determining, by the first terminal device, to carry content common to the first information and the third information in the second information;

determining, by the first terminal device, to carry content of the first information and the third information that is supported by the first terminal device in the second information;

determining, by the first terminal device, to carry information sent by a relay device in the same group as the first terminal device in the second information; and determining, by the first terminal device, whether to carry the content of the first information and/or the third information in the second information according to configuration information of the first terminal device.

Optionally, in Example a, the determining, by the first terminal device, to carry the information sent by the relay device that matches the PLMN of the first terminal device in the second information may specifically include one of the following:

if the PLMN of the first terminal device is the same as the PLMN of the second terminal device, determining, by the first terminal device, to carry the content of the first information in the second information;

if the PLMN of the first terminal device is the same as the PLMN of the third terminal device, determining, by the first terminal device, to carry the content of the third information in the second information; and if the PLMN of the first terminal device is the same as the PLMN of the second terminal device and the PLMN of the third terminal device, determining, by the first terminal device, to carry the content of the first information and the third information in the second information.

For example, the PLMN is the serving PLMN, or the PLMN is the home PLMN, or the PLMN is the equivalent PLMN.

Optionally, in Example a, the determining, by the first terminal device, to carry the information sent by the relay device that matches the PLMN of the first terminal device in the second information may specifically include one of the following:

if an equivalent PLMN of the first terminal device is in the list of equivalent PLMNs of the second terminal device, determining, by the first terminal device, to carry the content of the first information in the second information;

if the equivalent PLMN of the first terminal device is in the list of equivalent PLMNs of the third terminal device, determining, by the first terminal device, to carry the content of the third information in the second information;

if the equivalent PLMN of the first terminal device is in the list of equivalent PLMNs of the second terminal device, and the equivalent PLMN of the first terminal device is in the list of equivalent PLMNs of the third terminal device, determining, by the first terminal device, to carry the content of the first information and the third information in the second information;

if the equivalent PLMN of the second terminal device is in a list of equivalent PLMNs of the first terminal device, determining, by the first terminal device, to carry the content of the first information in the second information;

if the equivalent PLMN of the third terminal device is in the list of equivalent PLMNs of the first terminal device, determining, by the first terminal device, to carry the content of the third information in the second information;

if the equivalent PLMN of the second terminal device is in the list of equivalent PLMNs of the first terminal device, and the equivalent PLMN of the third terminal device is in the list of equivalent PLMNs of the first terminal device, determining, by the first terminal device, to carry the content of the first information and the third information in the second information.

Optionally, configuration information of the first terminal device is configured by the network device, or the configuration information of the first terminal device is obtained according to the subscription information, or the configuration information of the first terminal device is configured by the first terminal device.

Optionally, as Example b, the first information is used for indicating the information of the relay device to which the second terminal device can be relayed.

Optionally, in Example b, the first information includes at least one piece of the following information:

service information supported by the second terminal device, information of a group to which the second terminal device belongs, slicing information supported by the second terminal device, DNN information supported by the second terminal device, PLMN information of the second terminal device, and information of a device to which the second terminal device can be relayed.

Optionally, in Example b, the first information further includes at least one piece of the following information:

hop count information from at least one relay device to the second terminal device, and hop count information from at least one relay device to a next-hop relay device of the second terminal device.

Optionally, in Example b, the determining, by the first terminal device, whether to carry the content of the first information in the second information may specifically include:

if the hop count information is greater than or equal to a first threshold, determining, by the first terminal device, not to carry the content of the first information in the second information; or, if the hop count information is less than the first threshold, determining, by the first terminal device, to carry the content of the first information in the second information.

That is, the first threshold may be used by the first terminal device to determine, in combination with the hop count information, whether to carry the content of the first information in the second information.

Optionally, the first threshold is set by the network device, or the first threshold is configured according to the subscription information, or the first threshold is configured by the first terminal device, or the first threshold is carried in the first information.

Optionally, in the embodiments of the present disclosure, in a case where the first information includes the hop count information from the at least one relay device to the second terminal device and/or the hop count information from the at least one relay device to the next-hop relay device of the second terminal device, the first terminal device sends the second information according to the hop count information.

Optionally, in the embodiments of the present disclosure, the first terminal device starts a first timer; and if no device is connected to the first terminal device when the first timer expires, the first terminal device stops sending the second information.

For example, when sending the second information, the first terminal device starts the first timer.

Optionally, in the embodiments of the present disclosure, if no device is connected to the first terminal device, the first terminal device stops sending the second information.

Specifically, if no device is connected to the first terminal device, the first terminal device starts the first timer; and if no device is connected to the first terminal device when the first timer expires, the first terminal device stops sending the second information.

Optionally, in the embodiments of the present disclosure, the first terminal device selects, among the at least one relay device, one or more relay device with a minimum hop count as the next-hop relay device; or, the first terminal device, among the at least one relay device, the relay device with the hop count within a first range, as the next-hop relay device.

Optionally, in the embodiments of the present disclosure, the second terminal device starts the first timer; and if no device is connected to the second terminal device when the first timer expires, the second terminal device stops sending the first information.

For example, when sending the first information, the second terminal device starts the first timer.

Optionally, in the embodiments of the present disclosure, if no device is connected to the second terminal device, the second terminal device stops sending the first information.

Specifically, if no device is connected to the second terminal device, the second terminal device starts the first timer; and if no device is connected to the second terminal device when the first timer expires, the second terminal device stops sending the first information.

Optionally, in the embodiments of the present disclosure, the second terminal device selects, among the at least one relay device, one or more relay devices with a minimum hop count as the next-hop relay device; or, the second terminal device selects, among the at least one relay device, a relay device with the hop count within a first range as the next-hop relay device.

Optionally, in the embodiments of the present disclosure, according to the second information, the remote terminal device selects, among the at least one relay device, one or more relay devices with a minimum hop count as the next-hop relay device; or, according to the second information, the remote terminal device selects, among the at least one relay device, a relay device with the hop count within a first range as the next-hop relay device.

Therefore, in the embodiments of the present disclosure, the second terminal device and/or the third terminal device actively sends the discovery message, and when the remote terminal needs to be relayed, it needs not to trigger the relay device discovery procedure, which saves time for relay discovery.

The wireless communication method 300 provided by the embodiments of the present disclosure is described in detail below with reference to specific embodiments.

Figure 8:
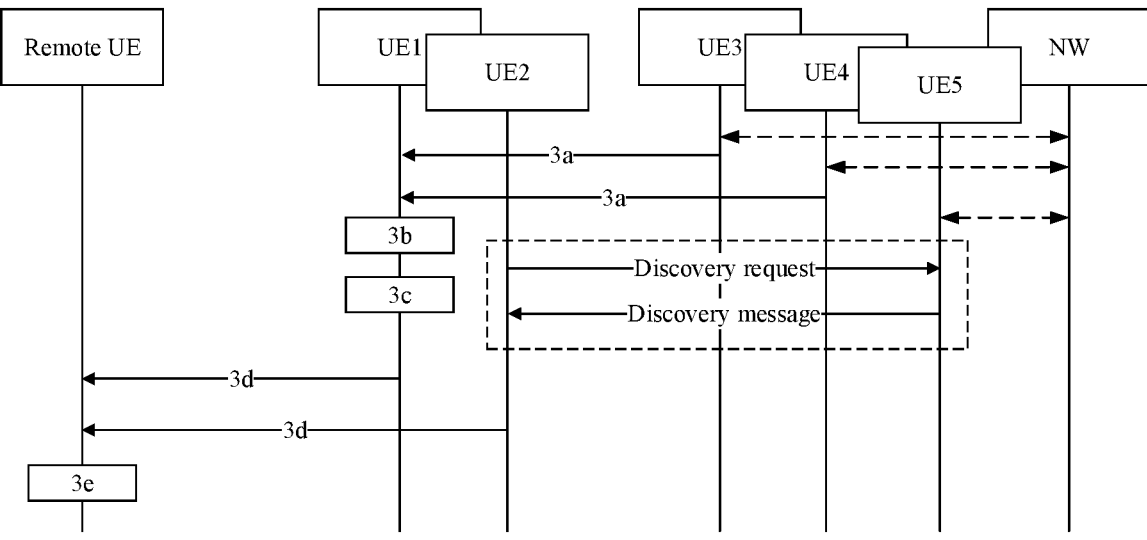
FIG. 8 is schematic flowchart of still another procedure for discovery of a relay device provided according to an embodiment of the present disclosure.

Optionally, as Embodiment 3, as shown in FIG. 8, the relay device actively sends the discovery message, and the remote UE selects the relay device according to the discovery messages sent by the relay devices around. The remote UE has an application that needs to perform the uplink and downlink communication with the network, and the remote UE decides to adopt the relay transmission manner. Optionally, the first terminal device may be UE 1 or UE 2, and the second terminal device may be UE 3 or UE 4. Specifically, the remote UE can implement the multi-hop relay communication through the following steps 3a to 3e.

In the 3a, UE 3 sends a discovery message 1 and UE 4 sends a discovery message 2.

The discovery message 1 carries the service information supported by UE 3, the group information of UE 3, the slicing information supported by UE 3, the DNN information supported by UE 3, the PLMN information of UE 3, and the like. The PLMN information of UE 3 may be the information of the serving PLMN of UE 3 or the HPLMN of UE 3 or the ePLMN of UE 3.

The discovery message 2 carries the service information supported by UE 4, the group information of UE 4, the slicing information supported by UE 4, the DNN information supported by UE 4, the PLMN information of UE 4, and the like. The PLMN information of UE 4 may be the information of the serving PLMN of UE 4 or the HPLMN of UE 4 or the ePLMN of UE 4.

It should be noted that, UE 3 and UE 4 are within the coverage of the network and has been registered with the network, and UE 3 and UE 4 may be in different cells, different registration areas, or different PLMNs.

Optionally, the relay device may be discovered through a procedure for the discovery request. For example, UE 2 in FIG. 8 discovers the UE 5 through the procedure for the discovery request, and the UE 5 may be relayed to the network. The specific process is the same as that described in Embodiment 1, details of which will not be repeated here for the sake of brevity.

In the 3b, UE 1 discovers the discovery message 1 sent by UE 3 and the discovery message 2 sent by UE 4.

In the 3*c*, UE 1 sends a discovery message 3, which includes part or all of the content of the discovery message 1 and the discovery message 2.

Specifically, the content of the discovery message 3 may be as follows:

1) the content carried in the discovery message 1 and the discovery message 2 is contained in the discovery message 3 by UE 1. Optionally, the discovery message 3 may further carry information of UE 3 and information of UE 4, such as identity information.

2) UE 1 selects the content of the discovery message in UE 3 and UE 4 sent by a relay device matching the PLMN information of UE 1 to be included in the discovery message 3.

Optionally, the matching of the PLMN information can be in the following manners:

a) UE 1 has the same serving PLMN as UE 3/UE 4;

b) UE 1 has the same HPLMN as UE 3/UE 4;

c) UE 1 has the same ePLMN as UE 3/UE 4;

d) the HPLMN of UE 1 is in the list of ePLMNs of UE 3/UE 4; and e) the HPLMN of UE 3/UE 4 is in the list of ePLMNs of UE 1.

3) UE 1 selects the common supported/allowed content in the discovery message 1 and the discovery message 2 to be included in the discovery message 3.

4) UE 1 selects the service information in the discovery message 1 and the discovery message 2 that can be allowed/supported by UE1 to be included in the discovery message 3.

5) UE 1 selects the group information in UE 3 and UE 4 that is the same as that of the group to which UE1 belongs to be included in the discovery message 3. For example, UE 1 belongs to groups 1 and 2; UE 3 belongs to groups 1, 2, and 3; and UE 4 belongs to group 4, then groups 1 and 2 are included in the discovery message 3 by UE 1.

6) UE 1 determines whether to have the content of the discovery message 1 and the discovery message 2 to be included in the discovery message 3 according to the configuration information. The configuration information may be set by a local user, or configured based on the subscription information or configured based on the network.

In the 3*d*. UE 1 sends the discovery message 3, and UE 2 sends a discovery message 4.

In the 3*e*, the remote UE can discover the content of the discovery message 3 sent by UE 1 and the content of the discovery message 4 sent by UE 2, and select the relay device to be used according to actual needs.

Optionally, in Embodiment 3, when selecting the next-hop relay device, the remote UE and the intermediate relay device preferentially select the relay device with the minimum hop count.

Figure 9:
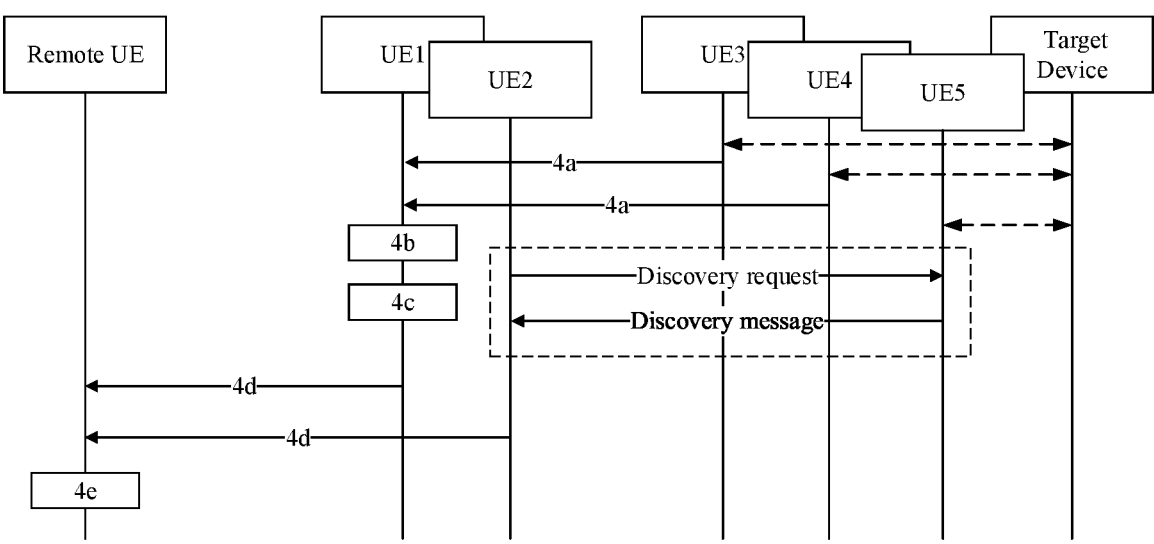
FIG. 9 is schematic flowchart of still another procedure for discovery of a relay device provided according to an embodiment of the present disclosure.

Optionally, as Embodiment 4, as shown in FIG. 9, the relay device actively sends the discovery message, and the remote UE selects the relay device according to the discovery messages sent by the relay devices around. The remote UE has an application that needs to perform the sidelink communication (PC5 communication) with the target device, and the remote UE decides to adopt the relay transmission manner. Optionally, the first terminal device may be UE 1 or UE 2, and the second terminal device may be UE 3 or UE 4. Specifically, the remote UE can implement the multi-hop relay communication through the following steps 4*a* to 4*e*.

In the 4*a*, UE 3 sends a discovery message 1 and UE 4 sends a discovery message 2.

The discovery message 1 carries information of a device that UE 3 can be relayed to, the service information supported by UE 3, the group information of UE 3, the slicing information supported by UE 3, the DNN information supported by UE 3, and the like. The discovery message 2 carries information of a device that UE 4 can be relayed to, the service information supported by UE 4, the group information of UE 4, the slicing information supported by UE 4, the DNN information supported by UE 4, and the like.

For example, the information of the device that UE 3 can be relayed to includes the information of the target device, and the information of the device that UE 4 can be relayed to includes the information of the target device.

Optionally, the discovery message 1 sent by UE 3 carries information of a previous-hop relay terminal. The discovery message 2 sent by UE 4 carries the information of the-previous hop relay terminal.

Optionally, the discovery message 1 includes information on the hop count from each hop relay device to UE 3, or, the discovery message 1 includes information on the hop count from each hop relay device to the next-hop relay device of the UE 3.

Optionally, the discovery message 2 includes information on the hop count from each hop relay device to UE 4, or, the discovery message 2 includes information on the hop count from each hop relay device to the next-hop relay device of the UE 4.

It should be noted that each relay device increases the received relay hop count by 1 and then includes it in the discovery message for sending. There is a threshold for the hop count with respect to the specific relay device in the discovery message. If the hop count in the discovery message received by the current relay device reaches or exceeds the threshold for the hop count, the information of this relay device is no longer included in the discovery message to be sent; or if the hop count in the discovery message received by the current relay device, after being increased by 1, reaches or exceeds the threshold for the hop count, the information of this relay device is no longer included in the discovery message to be sent.

Optionally, the relay device may be discovered through a procedure for the discovery request. For example, UE 2 in FIG. 9 discovers the UE 5 through the procedure for the discovery request, and the UE 5 may be relayed to the target device. The specific process is the same as that described in Embodiment 2, details of which will not be repeated here for the sake of brevity.

In the 4*b*, UE 1 discovers the discovery message 1 sent by UE 3 and the discovery message 2 sent by UE 4.

In the 4*c*, UE 1 sends a discovery message 3, which includes part or all of the content of the discovery message 1 and the discovery message 2.

Specifically, the content of the discovery message 3 may be as follows:

1) the content carried in the discovery message 1 and the discovery message 2 is contained in the discovery message 3 by UE 1. Optionally, the discovery message 3 may further carry information of UE 3 and information of UE 4, such as identity information.

2) UE 1 selects the common supported/allowed content in the discovery message 1 and the discovery message 2 to be included in the discovery message 3.

3) UE 1 selects the service information in the discovery message 1 and the discovery message 2 that can be allowed/supported by UE1 to be included in the discovery message 3.

4) UE 1 selects the group information in UE 3 and UE 4 that is the same as that of the group to which UE1 belongs to be included in the discovery message 3. For example, UE 1 belongs to groups 1 and 2; UE 3 belongs to groups 1, 2, and 3; and UE 4 belongs to group 4, then groups 1 and 2 are included in the discovery message 3 by UE 1.

5) UE 1 determines whether to have the content of the discovery message 1 and the discovery message 2 to be included in the discovery message 3 according to the configuration information. The configuration information may be set by a local user, or configured based on the subscription information or configured based on the network.

In the 4d, UE 1 sends the discovery message 3, and UE 2 sends a discovery message 4.

In the 4e, the remote UE can discover the content of the discovery message 3 sent by UE 1 and the content of the discovery message 4 sent by UE 2, and select the relay device to be used according to actual needs.

Optionally, in Embodiment 4, when selecting the next-hop relay device, the remote UE or the intermediate relay device considers the hop count information with respect to the target device that is carried in the next-hop relay device discovery message, and selects the relay device with the minimum hop count to the target device.

In the schemes of Embodiment 3 and Embodiment 4 above, the relay device always sends the discovery message, and when the remote UE needs to be relayed, there is no need to trigger the procedure for discovery of the relay device, which saves time for relay device discovery.

Optionally, as Embodiment 5, as shown in FIG. 8, the relay device actively sends the discovery message, and the remote UE selects the relay device according to the discovery messages sent by the relay devices around. The remote UE has an application that needs to perform the uplink and downlink communication with the network, and the remote UE decides to adopt the relay transmission manner. When UE 4 updates the content in its discovery message 2, updating of content may include modifying or deleting the content of the discovery message 2 mentioned in the step 3a in the above Embodiment 3, or adding content to the discovery message 2. Alternatively, the discovery message 2 sent by UE 4 cannot be detected by UE1.

UE 1 needs to update the discovery message 2 in the step 3b accordingly to add, modify or delete the corresponding content.

It should be understood that for the specific processes in Embodiment 5, reference may be made to the relevant description of Embodiment 3 above, and details are not repeated here. Please note that the scheme in Embodiment 5 can also be applied to Embodiment 4 above, so as to update the content of the discovery message 2 sent by UE 4 in Embodiment 4, which is not repeated here for the sake of brevity.

In the scheme of the above-mentioned Embodiment 5, the update of the discovery message can be realized, and the real-time update of the relay device can be maintained.

Optionally, as Embodiment 6, as described in Embodiments 1 to 5 above, when the relay device starts to send the discovery request message or the discovery message, a timer is started, and when the timer expires, if no device is connected to the relay device, the relay device stops sending the discovery request message or the discovery message; or, as described in Embodiment 1 to Embodiment 5 above, if no device is connected to the relay device, the sending of the discovery request message or the discovery message is stopped; specifically, when no device is connected to the relay device, the timer is started, when the timer expires, if no device is connected to the relay device, the sending of the discovery request message or the discovery message is stopped.

In the scheme of Embodiment 6 above, the relay device can actively stop sending the discovery request message or the discovery message when the conditions are met, so that the relay device can save power consumption.

Figure 10:
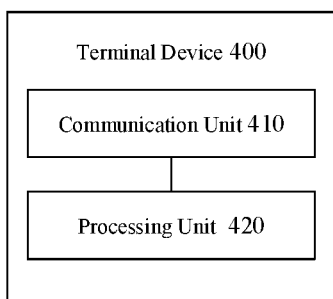
FIG. 10 is a schematic block diagram of a terminal device provided according to an embodiment of the present disclosure.

FIG. 10 shows a schematic block diagram of a terminal device 400 according to an embodiment of the present disclosure. As shown in FIG. 10, the terminal device 400 is a first terminal device, and the terminal device 400 includes:

a communication unit 410, configured to receive first information sent by a second terminal device, where the first information is used for discovery of a relay device; and a processing unit 420, configured to make a response to the first information.

Optionally, the processing unit 420 is specifically configured to:

determine whether perform discovery of a next-hop relay device.

Optionally, the first information includes at least one piece of the following information:

service information to be discovered, group information to be discovered, slicing information to be discovered, DNN information, information of the second terminal device, and PLMN information of the second terminal device.

Optionally, the second terminal device has an application that needs to communicate with a network device and the second terminal device is configured to establish uplink and downlink communication connection with the network device in a relay transmission manner.

Optionally, the determining, by the processing unit 420, whether to perform the discovery of the next-hop relay device includes at least one of the following:

determining, by the processing unit 420, whether to perform the discovery of the next-hop relay device according to whether the first terminal device is within coverage of the network;

determining, by the processing unit 420, whether to perform the discovery of the next-hop relay device according to content of the first information;

determining, by the processing unit 420, whether to perform the discovery of the next-hop relay device according to whether the first terminal device is in a PLMN of the second terminal device;

determining, by the processing unit 420, whether to perform the discovery of the next-hop relay device according to setting information of the first terminal device; and determining, by the processing unit 420, whether to perform the discovery of the next-hop relay device according to a relationship between the first terminal device and the second terminal device.

Optionally, the first information includes at least one piece of the following information:

service information to be discovered, group information to be discovered, slicing information to be discovered, DNN information, information of the second terminal device, PLMN information of the second terminal device, information of a group to which the second terminal device belongs, information of a third terminal device, and PLMN information of the third terminal device Optionally, is the third terminal device has an application that needs to communicate with a network device, and the third terminal device is configured to establish uplink and downlink communication connection with the network device in a relay transmission manner.

Optionally, the determining, by the processing unit 420, whether to perform the discovery of the next-hop relay device includes at least one of the following:

determining, by the processing unit 420, whether to perform the discovery of the next-hop relay device according to whether the first terminal device is within the coverage of the network;

determining, by the processing unit 420, whether to perform the discovery of the next-hop relay device according to content of the first information;

determining, by the processing unit 420, whether to perform the discovery of the next-hop relay device according to whether the first terminal device is in a PLMN of the second terminal device;

determining, by the processing unit 420, whether to perform the discovery of the next-hop relay device according to whether the first terminal device is in a PLMN of the third terminal device;

determining, by the processing unit 420, whether to perform the discovery of the next-hop relay device according to setting information of the first terminal device;

determining, by the processing unit 420, whether to perform the discovery of the next-hop relay device according to a relationship between the first terminal device and the second terminal device; and determining, by the processing unit 420, whether to perform the discovery of the next-hop relay device according to a relationship between the first terminal device and the third terminal device.

Optionally, the first information includes at least one piece of the following information:

information of a target device, service information to be discovered, group information to be discovered, slicing information to be discovered, DNN information, information of the second terminal device, PLMN information of the target device, and PLMN information of the second terminal device.

Optionally, the second terminal device has an application that needs to communicate with the target device, and the second terminal device is configured to establish sidelink communication connection with the target device in a relay transmission manner.

Optionally, the determining, by the processing unit 420, whether to perform the discovery of the next-hop relay device includes at least one of the following:

determining, by the processing unit 420, whether to perform the discovery of the next-hop relay device according to content of the first information;

determining, by the processing unit 420, whether to perform the discovery of the next-hop relay device according to whether the first terminal device is in a PLMN of the second terminal device;

determining, by the processing unit 420, whether to perform the discovery of the next-hop relay device according to setting information of the first terminal device;

determining, by the processing unit 420, whether to perform the discovery of the next-hop relay device according to a relationship between the first terminal device and the second terminal device;

determining, by the processing unit 420, whether to perform the discovery of the next-hop relay device according to whether the target device has been discovered;

determining, by the processing unit 420, whether to perform the discovery of the next-hop relay device according to a relationship between the first terminal device and the target device;

determining, by the processing unit 420, whether to perform the discovery of the next-hop relay device according to whether the first terminal device matches the PLMN information of the target device; and determining, by the processing unit 420, whether to perform the discovery of the next-hop relay device according to whether the first terminal device is in the same group as the target device.

Optionally, the first information includes at least one piece of the following information:

information of a target device, service information to be discovered, group information to be discovered, slicing information to be discovered, DNN information, PLMN information of the target device, information of the second terminal device, PLMN information of the second terminal device, information of a group to which the second terminal device belongs, information of a third terminal device, and PLMN information of the third terminal device.

Optionally, the third terminal device has an application that needs to communicate with the target device, and the third terminal device is configured to establish sidelink communication connection with the target device in a relay transmission manner.

Optionally, the determining, by the processing unit 420, whether to perform the discovery of the next-hop relay device includes at least one of the following:

determining, by the processing unit 420, whether to perform the discovery of the next-hop relay device according to content of the first information;

determining, by the processing unit 420, whether to perform the discovery of the next-hop relay device according to whether the first terminal device is in a PLMN of the second terminal device;

determining, by the processing unit 420, whether to perform the discovery of the next-hop relay device according to whether the first terminal device is in a PLMN of the third terminal device;

determining, by the processing unit 420, whether to perform the discovery of the next-hop relay device according to setting information of the first terminal device;

determining, by the processing unit 420, whether to perform the discovery of the next-hop relay device according to a relationship between the first terminal device and the second terminal device;

determining, by the processing unit 420, whether to perform the discovery of the next-hop relay device according to whether the target device has been discovered;

determining, by the processing unit 420, whether to perform the discovery of the next-hop relay device according to a relationship between the first terminal device and the target device;

determining, by the processing unit 420, whether to perform the discovery of the next-hop relay device according to a relationship between the first terminal device and the third terminal device;

determining, by the processing unit 420, whether to perform the discovery of the next-hop relay device according to whether the first terminal device matches the PLMN information of the target device; and determining, by the processing unit 420, whether to perform the discovery of the next-hop relay device according to whether the first terminal device is in the same group as the target device.

Optionally, the determining, by the processing unit 420, whether to perform the discovery of the next-hop relay device according to whether the first terminal device is within the coverage of the network includes:

if the first terminal device is within the coverage of the network, determining, by the processing unit 420, not to perform discovery of the next-hop relay device; or if the first terminal device is not within the coverage of the network, determining, by the processing unit 420, to perform the discovery of the next-hop relay device.

Optionally, the determining, by the processing unit 420, whether to perform the discovery of the next-hop relay device according to the content of the first information includes:

determining, by the processing unit 420, to perform the discovery of the next-hop relay device in at least one of the following situations where:

the first terminal device is in a group indicated by the group information to be discovered, the slicing information to be discovered and/or the DNN information are supported by the first terminal device, and the service information to be discovered is not prohibited; and determining, by the processing unit 420, not to perform the discovery of the next-hop relay device in at least one of the following situations where:

the first terminal device is not in the group indicated by the group information to be discovered, the slicing information to be discovered or the DNN information is not supported by the first terminal device, and the service information to be discovered is prohibited.

Optionally, the determining, by the processing unit 420, whether to perform the discovery of the next-hop relay device according to whether the first terminal device is in the PLMN of the second terminal device includes:

determining, by the processing unit 420, to perform the discovery of the next-hop relay device in at least one of the following situations where:

a PLMN where the first terminal device resides belongs to the PLMN information of the second terminal device, a home PLMN of the first terminal device belongs to the PLMN information of the second terminal device, and an equivalent PLMN of the first terminal device belongs to the PLMN information of the second terminal device; and determining, by the processing unit 420, not to perform the discovery of the next-hop relay device in at least one of the following situations where:

the PLMN where the first terminal device resides does not belong to the PLMN information of the second terminal device, the home PLMN of the first terminal device does not belong to the PLMN information of the second terminal device, and the equivalent PLMN of the first terminal device does not belong to the PLMN information of the second terminal device.

Optionally, the determining, by the processing unit 420, whether to perform the discovery of the next-hop relay device according to the setting information of the first terminal device includes:

if the setting information of the first terminal device indicates that the first terminal device is allowed to function as the relay device, determining, by the processing unit 420, to perform the discovery of the next-hop relay device; and if the setting information of the first terminal device indicates that the first terminal device is not allowed to function as the relay device, determining, by the processing unit 420, not to perform the discovery of the next-hop relay device.

Optionally, the determining, by the processing unit 420, whether to perform the discovery of the next-hop relay device according to the relationship between the first terminal device and the second terminal device includes:

if the information of the second terminal device is included in configuration information of the first terminal device, determining, by the processing unit 420, to perform the discovery of the next-hop relay device; and if the information of the second terminal device is not included in the configuration information of the first terminal device, determining, by the processing unit 420, not to perform the discovery of the next-hop relay device.

Optionally, the determining, by the processing unit 420, whether to perform the discovery of the next-hop relay device according to whether the target device has been discovered includes:

if the target device has been discovered, determining, by the processing unit 420, not to perform the discovery of the next-hop relay device; or if the target device is not discovered, determining, by the processing unit 420, to perform the discovery of the next-hop relay device Optionally, the determining, by the processing unit 420, whether to perform the discovery of the next-hop relay device according to the relationship between the first terminal device and the target device includes:

if the information of the target device is included in configuration information of the first terminal device, determining, by the processing unit 420, to perform the discovery of the next-hop relay device; or if the information of the target device is not included in the configuration information of the first terminal device, determining, by the processing unit 420, not to perform the discovery of the next-hop relay device.

Optionally, the determining, by the processing unit 420, whether to perform the discovery of the next-hop relay device according to whether the first terminal device matches the PLMN information of the target device includes:

determining, by the processing unit 420, to perform the discovery of the next-hop relay device in at least one of the following situations:

a PLMN with which the first terminal device is registered belongs to the PLMN information of the target device, a home PLMN of the first terminal device belongs to the PLMN information of the target device, and an equivalent PLMN of the first terminal device belongs to the PLMN information of the target device; and determining, by the processing unit 420, not to perform the discovery of the next-hop relay device in at least one of the following situations:

the PLMN with which the first terminal device is registered does not belong to the PLMN information of the target device, the home PLMN of the first terminal device does not belong to the PLMN information of the target device, and the equivalent PLMN of the first terminal device does not belong to the PLMN information of the target device.

Optionally, the determining, by the processing unit 420, whether to perform the discovery of the next-hop relay device according to whether the first terminal device is in the same group as the target device includes:

if the first terminal device is in the same group as the target device, determining, by the processing unit 420, to perform the discovery of the next-hop relay device; or if the first terminal device is in a different group from the target device, determining, by the processing unit 420, not to perform the discovery of the next-hop relay device.

Optionally, the determining, by the processing unit 420, whether to perform the discovery of the next-hop relay device according to whether the first terminal device is in the PLMN of the third terminal device includes:

determining, by the processing unit 420, to perform the discovery of the next-hop relay device in at least one of the following situations:

a PLMN where the first terminal device resides belongs to the PLMN information of the third terminal device, a home PLMN of the first terminal device belongs to the PLMN information of the third terminal device, and an equivalent PLMN of the first terminal device belongs to the PLMN information of the third terminal device; and determining, by the processing unit 420, not to perform the discovery of the next-hop relay device in at least one of the following situations:

the PLMN where the first terminal device resides does not belong to the PLMN information of the third terminal device, the home PLMN of the first terminal device does not belong to the PLMN information of the third terminal device, and the equivalent PLMN of the first terminal device does not belong to the PLMN information of the third terminal device.

Optionally, the determining, by the processing unit 420, whether to perform the discovery of the next-hop relay device according to the relationship between the first terminal device and the third terminal device includes:

if the information of the third terminal device is included in configuration information of the first terminal device, determining, by the processing unit 420, to perform the discovery of the next-hop relay device; or if the information of the third terminal device is not included in the configuration information of the first terminal device, determining, by the processing unit 420, not to perform the discovery of the next-hop relay device.

Optionally, the setting information of the first terminal device is set by the network device, or the setting information of the first terminal device is obtained from subscription information, or, the setting information of the first terminal device is set by a user.

Optionally, the configuration information of the first terminal device is configured by the network device, or the configuration information of the first terminal device is obtained according to subscription information, or, the configuration information of the first terminal device is configured by the first terminal device.

Optionally, the second terminal device is a device that initially initiates information for discovery of the relay device.

Optionally, the second terminal device is another relay device other than the relay device.

Optionally, the first information includes information on a hop count for the second terminal device in relay transmission;

the processing unit 420 is further configured to update information on the hop count;

if the updated hop count is greater than or equal to a first threshold, or the hop count for the second terminal device in the relay transmission is greater than or equal to the first threshold, the processing unit 420 is further configured to determine not to perform the discovery of the next-hop relay device; or if the updated hop count is less than the first threshold, or the hop count for the second terminal device in the relay transmission is less than the first threshold, the processing unit 420 is further configured to determine to perform the discovery of the next-hop relay device.

Optionally, the first threshold is set by the network device, or the first threshold is configured according to subscription information, or the first threshold is configured by the first terminal device, or the first threshold is carried in the first information.

Optionally, if it is determined by the first terminal device to perform the discovery of the next-hop relay device, the communication unit 410 is further configured to send second information for the discovery of the relay device to a fourth terminal device, and the second information includes the content of the first information, and the second information further includes at least one piece of the following information:

information of the first terminal device, PLMN information of the first terminal device, and information of a group to which the first terminal device belongs.

Optionally, the second information further includes information on a hop count for the first terminal device in the relay transmission.

Optionally, the second information further includes a first threshold, and the first threshold is used by the fourth terminal device to determine, in conjunction with the information on the hop count for the first terminal device in the relay transmission, whether to perform the discovery of the next-hop relay device.

Optionally, the processing unit 420 is further configured to start a first timer;

if no device is connected to the first terminal device when the first timer expires, the communication unit 410 is further configured to stop sending the second information.

Optionally, the processing unit 420 is specifically configured to:

start the first timer when the second information is sent.

Optionally, if no device is connected to the first terminal device, the communication unit 410 stops sending the second information.

Optionally, if no device is connected to the first terminal device, the processing unit 420 is further configured to start a first timer; and if no device is connected to the first terminal device when the first timer expires, the communication unit 410 is further configured to stop sending the second information.

Optionally, the communication unit 410 is further configured to receive response information to the second information sent by the fourth terminal device; and the communication unit 410 is further configured to forward the response information to the second terminal device.

Optionally, the response information is used for indicating that the next-hop relay device has been discovered.

Optionally, the response information includes at least one piece of the following information:

service information supported by the next-hop relay device, information of a group to which the next-hop relay device belongs, slicing information supported by the next-hop relay device, DNN information supported by the next-hop relay device, and PLMN information of the next-hop relay device.

Optionally, the response information is used for indicating that the next-hop relay device is not discovered.

Optionally, the processing unit 420 is further configured to select, among at least one relay device, one or more relay device with a minimum hop count as the next-hop relay device; or, the processing unit 420 is further configured to select, among the at least one relay device, a relay device with a hop count within a first range as the next-hop relay device.

It should be understood that the terminal device 400 according to the embodiments of the present disclosure may correspond to the first terminal device in the method embodiments of the present disclosure, and the above and other operations and/or functions of the units in the terminal device 400 respectively implement the corresponding process for the first terminal device in the method 200 as shown in FIG. 4, which will not be repeated here for the sake of brevity.

Figure 11:
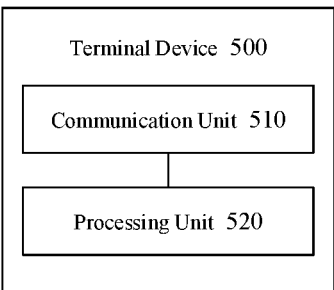
FIG. 11 is a schematic block diagram of another terminal device provided according to an embodiment of the present disclosure.

FIG. 11 shows a schematic block diagram of a terminal device 500 according to an embodiment of the present disclosure. As shown in FIG. 11, the terminal device 500 is a first terminal device, and the terminal device 500 includes:

a communication unit 510, configured to detect first information sent by at least one second terminal device, where the first information is used for indicating that a second terminal device can be relayed to a network, or the first information is used for indicating information of a relay device to which the second terminal device can be relayed; and a processing unit 520, configured to make a response to the first information.

Optionally, the processing unit 520 is specifically configured to:

determine whether to carry content of the first information in second information used for indicating discovery of the relay device.

Optionally, the communication unit 510 is further configured to detect first indication information for the first information sent by the second terminal device;

the processing unit 520 is further configured to update part or all of the content of the first information according to the first indication information.

Optionally, the processing unit 520 is specifically configured to:

modify or delete part or all of the content of the first information, or add content to the first information, according to the first indication information.

Optionally, if the first information is used for indicating that the second terminal device can be relayed to the network, the first information includes at least one piece of the following information:

service information supported by the second terminal device, information of a group to which the second terminal device belongs, slicing information supported by the second terminal device, Data Network Name (DNN) information supported by the second terminal device, Public Land Mobile Network (PLMN) information of the second terminal device.

Optionally, the PLMN information of the second terminal device includes at least one of the following:

a serving PLMN of the second terminal device, a home PLMN of the second terminal device, an equivalent PLMN of the second terminal device, and a list of equivalent PLMNs of the second terminal device Optionally, the communication unit 510 is further configured to detect third information sent by a third terminal device, where the third information is used for indicating that the third terminal device can be relayed to the network; and the processing unit 520 is specifically configured to:

determine whether to carry the content of the first information and/or the third information in the second information.

Optionally, the third information includes at least one piece of the following information:

service information supported by the third terminal device, information of a group to which the third terminal device belongs, slicing information supported by the third terminal device, DNN information supported by the third terminal device, and PLMN information of the third terminal device.

Optionally, the PLMN information of the third terminal device includes at least one of the following:

a serving PLMN of the third terminal device, a home PLMN of the third terminal device, an equivalent PLMN of the third terminal device, and a list of equivalent PLMNs of the third terminal device.

Optionally, the communication unit 510 is further configured to detect second indication information for the third information sent by the third terminal device; and the processing unit 520 is further configured to update part or all of the content of the third information according to the second indication information.

Optionally, the processing unit 520 is specifically configured to:

add content to the third information, or modify or delete part or all of the content of the third information, according to the second indication information.

Optionally, the processing unit 520 is specifically configured to:

determine to carry all of the content of the first information and the third information in the second information; or, determine to carry information sent by a relay device matching the PLMN of the first terminal device in the second information; or, determine to carry content common to the first information and the third information in the second information; or, determine to carry content of the first information and the third information that is supported by the first terminal device in the second information; or, determine to carry information sent by a relay device in the same group as the first terminal device in the second information; or, determine whether to carry the content of the first information and/or the third information in the second information according to configuration information of the first terminal device.

Optionally, the processing unit 520 is specifically configured to:

if the PLMN of the first terminal device is the same as the PLMN of the second terminal device, determine to carry the content of the first information in the second information; or, if the PLMN of the first terminal device is the same as the PLMN of the third terminal device, determine to carry the content of the third information in the second information; or, if the PLMN of the first terminal device is the same as the PLMN of the second terminal device and the PLMN of the third terminal device, determine to carry the content of the first information and the third information in the second information.

Optionally, the PLMN is a serving PLMN, or the PLMN is a home PLMN, or the PLMN is an equivalent PLMN.

Optionally, the processing unit 520 is specifically configured to:

if an equivalent PLMN of the first terminal device is in the list of equivalent PLMNs of the second terminal device, determine to carry the content of the first information in the second information; or, if the equivalent PLMN of the first terminal device is in the list of equivalent PLMNs of the third terminal device, determine to carry the content of the third information in the second information; or, if the equivalent PLMN of the first terminal device is in the list of equivalent PLMNs of the second terminal device, and the equivalent PLMN of the first terminal device is in the list of equivalent PLMNs of the third terminal device, determine to carry the content of the first information and the third information in the second information; or, if the equivalent PLMN of the second terminal device is in a list of equivalent PLMNs of the first terminal device, determine to carry the content of the first information in the second information; or, if the equivalent PLMN of the third terminal device is in the list of equivalent PLMNs of the first terminal device, determine to carry the content of the third information in the second information; or, if the equivalent PLMN of the second terminal device is in the list of equivalent PLMNs of the first terminal device, and the equivalent PLMN of the third terminal device is in the list of equivalent PLMNs of the first terminal device, determine to carry the content of the first information and the third information in the second information.

Optionally, the configuration information of the first terminal device is configured by a network device, or the configuration information of the first terminal device is obtained according to subscription information, or, the configuration information of the first terminal device is configured by the first terminal device.

Optionally, if the first information is used for indicating the information of the relay device to which the second terminal device can be relayed, the first information includes at least one piece of the following information:

service information supported by the second terminal device, information of a group to which the second terminal device belongs, slicing information supported by the second terminal device, DNN information supported by the second terminal device, PLMN information of the second terminal device, and information of a device to which the second terminal device can be relayed.

Optionally, the first information further includes at least one piece of the following information:

hop count information from at least one relay device to the second terminal device, and hop count information from at least one relay device to a next-hop relay device of the second terminal device.

Optionally, the processing unit 520 is specifically configured to:

if the hop count information is greater than or equal to a first threshold, determine not to carry the content of the first information in the second information; or, if the hop count information is less than the first threshold, determine to carry the content of the first information in the second information.

Optionally, the first threshold is set by the network device, or the first threshold is configured according to subscription information, or the first threshold is configured by the first terminal device, or the first threshold is carried in the first information.

Optionally, the communication unit 510 is further configured to send the second information.

Optionally, the first information further includes at least one piece of the following information:

the hop count information from the at least one relay device to the second terminal device, and the hop count information from the at least one relay device to the next-hop relay device of the second terminal device;

the communication unit 510 is specifically configured to: send the second information according to the hop count information.

Optionally, the processing unit 520 is further configured to start a first timer; and if no device is connected to the first terminal device when the first timer expires, the communication unit is further configured to stop sending the second information.

Optionally, the processing unit 520 is specifically configured to: start the first timer when the second information is sent.

Optionally, if no device is connected to the first terminal device, the communication unit 510 is further configured to stop sending the second information.

Optionally, if no device is connected to the first terminal device, the processing unit 520 is further configured to start a first timer; and if no device is connected to the first terminal device when the first timer expires, the communication unit 510 is further configured to stop sending the second information.

Optionally, the processing unit 520 is further configured to select, among at least one relay device, one or more relay devices with a minimum hop count as the next-hop relay device; or, the processing unit 520 is further configured to select, among the at least one relay device, a relay device with a hop count within a first range as the next-hop relay device.

It should be understood that the terminal device 500 according to the embodiments of the present disclosure may correspond to the first terminal device in the method embodiments of the present disclosure, and the above and other operations and/or functions of the respective units in the terminal device 500 respectively implement the corresponding process of the first terminal device in the method 300 shown in FIG. 7, which will not be repeated here for the sake of brevity.

Figure 12:
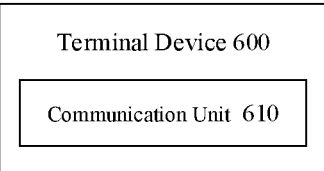
FIG. 12 is a schematic block diagram of another terminal device provided according to an embodiment of the present disclosure.

FIG. 12 shows a schematic block diagram of a terminal device 600 according to an embodiment of the present disclosure. As shown in FIG. 12, the terminal device 600 is a second terminal device, and the terminal device 600 includes:

a communication unit 610, configured to actively send first information, where the first information is used for indicating that the second terminal device can be relayed to a network, or the first information is used for indicating information of a relay device to which the second terminal device can be relayed.

Optionally, if it is determined by the second terminal device that the first information needs to be updated, the communication unit 610 is further configured to send first indication information for the first information, and the first indication information is used for indicating a peer device to update part or all of content of the first information.

Optionally, the first indication information is specifically used for indicating the peer device to modify or delete part or all of the content of the first information, or to add content to the first information.

Optionally, if the first information is used for indicating that the second terminal device can be relayed to the network, the communication unit 610 is specifically configured to:

actively send the first information when the second terminal device is within coverage of the network and has been registered with the network.

Optionally, the first information includes at least one piece of the following information:

service information supported by the second terminal device, information of a group to which the second terminal device belongs, slicing information supported by the second terminal device, Data Network Name (DNN) information supported by the second terminal device, and Public Land Mobile Network (PLMN) information of the second terminal device.

Optionally, the PLMN information of the second terminal device includes at least one of the following:

a serving PLMN of the second terminal device, a home PLMN of the second terminal device, an equivalent PLMN of the second terminal device, and a list of equivalent PLMNs of the second terminal device.

Optionally, if the first information is used for indicating the information of the relay device to which the second terminal device can be relayed, the first information further includes at least one piece of the following information:

hop count information from at least one relay device to the second terminal device, and hop count information from at least one relay device to a next-hop relay device of the second terminal device.

Optionally, the first information further includes a first threshold, and the first threshold is used for determining, in conjunction with the hop count information, whether to carry the content of the first information in information used for indicating discovery of the relay device sent by the peer device.

Optionally, the first threshold is set by a network device, or the first threshold is configured according to subscription information, or the first threshold is configured by the second terminal device.

Optionally, the terminal device 600 further includes:

a processing unit 620, configured to start a first timer;

if no device is connected to the second terminal device when the first timer expires, the communication unit 610 is further configured to stop sending the first information.

Optionally, the processing unit 620 is specifically configured to:

start the first timer when the first information is sent.

Optionally, if no device is connected to the second terminal device, the communication unit is further configured to stop sending the first information.

If no device is connected to the second terminal device, the processing unit 620 is further configured to start a first timer; and if no device is connected to the second terminal device when the first timer expires, the communication unit 610 is further configured to stop sending the first information.

Optionally, the terminal device 600 further includes: a processing unit 620, the processing unit 620 is further configured to select, among at least one relay device, one or more relay devices with a minimum hop count as a next-hop relay device; or, the processing unit 620 is further configured to select, among the at least one relay device, a relay device with a hop count within a first range as the next-hop relay device.

It should be understood that the terminal device 600 according to the embodiments of the present disclosure may correspond to the second terminal device in the method embodiments of the present disclosure, and the above and other operations and/or functions of the respective units in the terminal device 600 respectively implement the corresponding process of the second terminal device in the method 300 shown in FIG. 7, which will not be repeated here for the sake of brevity.

Figure 13:
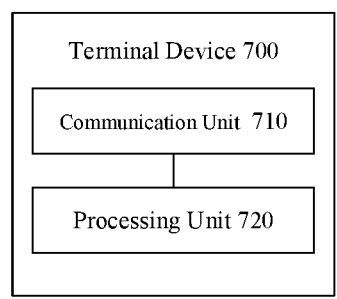
FIG. 13 is a schematic block diagram of still another terminal device provided according to an embodiment of the present disclosure.

FIG. 13 shows a schematic block diagram of a terminal device 700 according to an embodiment of the present disclosure. As shown in FIG. 13, the terminal device 700 is a remote terminal device, and the terminal device 700 includes:

a communication unit 710, configured to detect second information sent by at least one first terminal device, where the second information is used for indicating discovery of a relay device; and a processing unit 720, configured to select the relay device according to the second information, and performing relay communication.

Optionally, the second information includes content in first information and/or third information, the first information is used for indicating that a second terminal device can be relayed to a network, and the third information is used for indicating that a third terminal device can be relayed to the network.

Optionally, the first information includes at least one piece of the following information:

service information supported by the second terminal device, information of a group to which the second terminal device belongs, slicing information supported by the second terminal device, Data Network Name (DNN) information supported by the second terminal device, and Public Land Mobile Network (PLMN) information of the second terminal device.

Optionally, the PLMN information of the second terminal device includes at least one of the following:

a serving PLMN of the second terminal device, a home PLMN of the second terminal device, an equivalent PLMN of the second terminal device, and a list of equivalent PLMNs of the second terminal device.

Optionally, the third information includes at least one piece of the following information:

service information supported by the third terminal device, information of a group to which the third terminal device belongs, slicing information supported by the third terminal device, DNN information supported by the third terminal device, and PLMN information of the third terminal device.

Optionally, the PLMN information of the third terminal device includes at least one of the following:

a serving PLMN of the third terminal device, a home PLMN of the third terminal device, an equivalent PLMN of the third terminal device, and a list of equivalent PLMNs of the third terminal device.

Optionally, the second information includes content in first information, and the first information is used for indicating information of the relay device that the second terminal device can be relayed to.

Optionally, the first information includes at least one piece of the following information:

service information supported by the second terminal device, information of a group to which the second terminal device belongs, slicing information supported by the second terminal device, DNN information supported by the second terminal device, PLMN information of the second terminal device, and information of a device to which the second terminal device can be relayed.

Optionally, the first information further includes at least one piece of the following information:

hop count information from at least one relay device to the second terminal device, and hop count information from at least one relay device to a next-hop relay device of the second terminal device.

Optionally, the processing unit 720 is further configured to select, according to the second information, among at least one relay device, one or more relay device with a minimum hop count as the next-hop relay device; or, the processing unit 720 is further configured to select, according to the second information, among the at least one relay device, a relay device with a hop count within a first range as the next-hop relay device.

It should be understood that the terminal device 700 according to the embodiments of the present disclosure may correspond to the remote terminal device in the method embodiments of the present disclosure, and the above and other operations and/or functions of the respective units in the terminal device 700 respectively implement the corresponding process of the remote terminal device in the method 300 shown in FIG. 7, which will not be repeated here for the sake of brevity.

Figure 14:
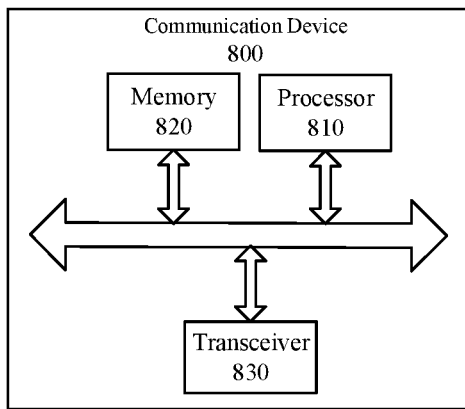
FIG. 14 is a schematic block diagram of a communication device provided according to an embodiment of the present disclosure.

FIG. 14 is a schematic structural diagram of a communication device 800 provided by an embodiment of the present disclosure. The communication device 800 shown in FIG. 14 includes a processor 810. The processor 810 may call and run a computer program from a memory, to implement the methods in the embodiments of the present disclosure.

Optionally, as shown in FIG. 14, the communication device 800 may further include a memory 820. The processor 810 may call and run the computer program from the memory 820, to implement the methods in the embodiments of the present disclosure.

The memory 820 may be a component independent of the processor 810, or may be integrated into the processor 810.

Optionally, as shown in FIG. 14, the communication device 800 may further include a transceiver 830. The processor 810 may control the transceiver 830 to communicate with another device. Specifically, the transceiver 830 may transmit information or data to another device, or receive information or data transmitted by another device.

The transceiver 830 may include a transmitter and a receiver. The transceiver 830 may further include an antenna. There may be one or more antennas.

Optionally, the communication device 800 may be the network device in the embodiments of the present disclosure, and the communication device 800 can implement respective procedures implemented by the network device in various methods according to embodiments of the present disclosure. For the sake of brevity, details are not described herein again.

Optionally, the communication device 800 may be the terminal device in the embodiments of the present disclosure, and the communication device 800 can implement respective procedures implemented by the terminal device in various methods according to embodiments of the present disclosure. For the sake of brevity, details are not described herein again.

Figure 15:
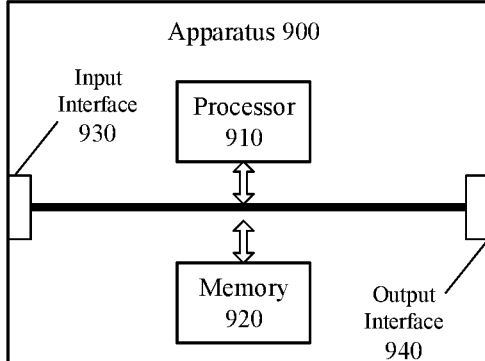
FIG. 15 is a schematic block diagram of an apparatus provided according to an embodiment of the present disclosure.

FIG. 15 is a schematic structural diagram of an apparatus provided by an embodiment of the present disclosure. The apparatus 900 shown in FIG. 15 includes a processor 910. The processor 910 may call a computer program from a memory and run the computer program, to implement the methods in the embodiments of the present disclosure.

Optionally, as shown in FIG. 15, the apparatus 900 may further include a memory 920. The processor 910 may call the computer program from the memory 920 and run the computer program, to implement the methods in the embodiments of the present disclosure.

The memory 920 may be a component independent of the processor 910, or may be integrated into the processor 910.

Optionally, the apparatus 900 may further include an input interface 930. The processor 910 may control the input interface 930 to communicate with another device or chip, and specifically, to obtain information or data transmitted by another device or chip.

Optionally, the apparatus 900 may further include an output interface 940. The processor 910 may control the output interface 940 to communicate with another device or chip, and specifically, to output information or data to another device or chip.

Optionally, the apparatus may be applied to the network device according to the embodiments of the present disclosure, and the apparatus can implement respective procedures implemented by the network device in various methods according to embodiments of the present disclosure. For the sake of brevity, details are not described herein again.

Optionally, the apparatus may be applied to the terminal device in the embodiments of the present disclosure, and the apparatus can implement respective procedures implemented by the terminal device in various methods according to embodiments of the present disclosure. For the sake of brevity, details are not described herein again.

Optionally, the apparatus mentioned in an embodiment of the present disclosure may also be a chip, such as a system-level chip, a system chip, a chip system, a system on chip, or the like.

Figure 16:
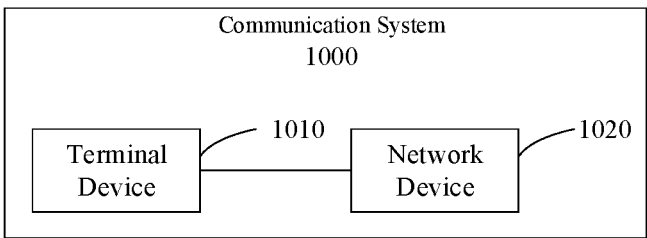
FIG. 16 is a schematic block diagram of a communication system provided according to an embodiment of the present disclosure.

FIG. 16 is a schematic structural diagram of a communication system 1000 provided by an embodiment of the present disclosure. The communication system 1000 shown in FIG. 16 includes a terminal device 1010 and a network device 1020.

The terminal device 1010 can implement respective functions implemented by the terminal device in the foregoing methods, and the network device 1020 can implement respective functions implemented by the network device or the base station in the foregoing methods. For the sake of brevity, details are not described herein again.

It should be understood that, the processor according to an embodiment of the present disclosure may be an integrated circuit chip, and has the signal processing capability. The steps of the foregoing method embodiments may be implemented by a hardware integrated logic circuit in the processor and/or implemented by instructions in a form of software. The foregoing processor may be a general purpose processor, a digital signal processor (DSP), an application specific integrated circuit (ASIC), a field programmable gate array (FPGA), or another programmable logic device, a discrete gate or a transistor logic device, or a discrete hardware component. Various methods, steps and logical block diagrams disclosed in embodiments of the present disclosure can be implemented or performed. The general purpose processor may be a microprocessor, or may be any conventional processor, or the like. Steps of the methods disclosed in connection with the embodiments of the present disclosure may be directly executed and completed by means of a hardware decoding processor, or may be executed and completed by using a combination of hardware and software modules in the decoding processor. The software modules may be located in a mature storage medium in the field, such as a random access memory, a flash memory, a read-only memory, a programmable read-only memory, an electrically-erasable programmable memory, or a register. The storage medium is located in the memory, the processor reads information from the memory and completes the steps in the foregoing method embodiments in combination with hardware of the processor.

It should be understood that, the memory in an embodiment of the present disclosure may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), which is used as an external cache. By way of examples but not limitation, many forms of RAM are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct Rambus random access memory (DRRAM). It should be noted that, the memory for the system and the method described in the embodiments of the present disclosure is intended to include but is not limited to these memories and any other suitable types of memory.

It should be understood that, the memory is an example but not intended for limitation. For example, the memory in an embodiment of the present disclosure may be alternatively a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct Rambus RAM (DR RAM), and the like. That is, the memory described in an embodiment of the present disclosure is intended to include but not limited to these memories and any other suitable types of memory.

An embodiment of the present disclosure further provides a computer readable storage medium. The computer readable storage medium is configured to store a computer program.

Optionally, the computer readable storage medium may be applied to the network device or the base station in the embodiments of the present disclosure, and the computer program enables a computer to execute respective procedures implemented by the network device or the base station in the methods of the embodiments of the present disclosure. For the sake of brevity, details are not described herein again.

Optionally, the computer readable storage medium may be applied to the mobile terminal/terminal device in the embodiments of the present disclosure, and the computer program enables the computer to execute respective procedures implemented by the mobile terminal/terminal device in the methods of the embodiments of the present disclosure. For the sake of brevity, details are not described herein again.

An embodiment of the present disclosure further provides a computer program product. The computer program product includes computer program instructions.

Optionally, the computer program product may be applied to the network device or the base station in the embodiments of the present disclosure, and the computer program instructions enable the computer to execute respective procedures implemented by the network device or the base station in the methods of the embodiments of the present disclosure. For the sake of brevity, details are not described herein again.

Optionally, the computer program product may be applied to the mobile terminal/terminal device in the embodiments of the present disclosure, and the computer program instructions enable the computer to execute respective procedures implemented by the mobile terminal/terminal device in the methods of the embodiments of the present disclosure. For the sake of brevity, details are not described herein again.

An embodiment of the present disclosure further provides a computer program.

Optionally, the computer program may be applied to the network device or the base station in the embodiments of the present disclosure. When running on a computer, the computer program enables the computer to execute respective procedures implemented by the network device or the base station in the methods of the embodiments of the present disclosure. For the sake of brevity, details are not described herein again.

Optionally, the computer program may be applied to the mobile terminal/terminal device in the embodiments of the present disclosure. When running on a computer, the computer program enables the computer to execute respective procedures implemented by the mobile terminal/terminal device in the method of the embodiments of the present disclosure. For the sake of brevity, details are not described herein again.

A person of ordinary skill in the art may recognize that, the exemplary units and algorithm steps described in connection with the embodiments of the present disclosure can be implemented in electronic hardware or a combination of computer software and electronic hardware. Whether these functions are executed by means of hardware or software depends on specific applications and design constraints of the technical solutions. A person skilled in the art may use different methods to implement the described functions for each particular application, and such implementation should not be considered as going beyond the scope of the present disclosure.

A person skilled in the art may clearly understand that, for the purpose of simple and clear description, with respect to specific work processes of the foregoing described systems, devices, and units, reference may be made to corresponding process in the foregoing method embodiments, and details are not described herein again.

It should be understood that systems, devices and methods disclosed in the embodiments provided in the present disclosure may be implemented in other ways. For example, the device embodiments described above are merely illustrative. For example, the division of units is merely logical function division, and there may be other division manners in actual implementations. For example, a plurality of units or components may be combined or integrated into another system, or some features may be ignored or not performed. In addition, the displayed or discussed mutual couplings or direct couplings or communication connections may be indirect coupling or communication connection through some interfaces, devices or units, and may be in electrical, mechanical or other forms.

The units described as separate parts may be or may not be physically separated, and the parts displayed as units may be or may not be physical units, and they may be located in one place, or may be distributed over multiple network units. Some of or all of the units may be selected according to actual needs so as to achieve the objectives of the solutions in embodiments of the present disclosure.

In addition, functional units in various embodiments of the present disclosure may be integrated into one processing unit, or each of the units may exist alone physically, or two or more units may be integrated into one unit.

When the functions are implemented in the form of software functional units and sold or used as an independent product, it can be stored in a computer-readable storage medium. Based on such understanding, the technical solutions of the present disclosure essentially, or the part contributing to the prior art, or some of the technical solutions, may be embodied in a form of software product. The software product is stored in a storage medium, and includes instructions for causing a computer device (which may be a personal computer, a server, or a network device) to perform all or some of the steps of the methods described in embodiments of the present disclosure. The foregoing storage medium includes any medium that can store program codes, such as a USB flash drive, a removable hard disk, a read-only memory (ROM), a random access memory (RAM), a magnetic disk, or an optical disc.

Those described above are merely specific implementations of the present disclosure, but the protection scope of the present disclosure is not limited thereto. Any changes or replacements readily conceived of by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless communication method, comprising:
receiving, by a first terminal device, first information sent by a second terminal device, wherein the first information is used for discovery of a relay device, the second terminal device is another relay device other than said relay device, and the first terminal device is a next-hop relay device of the second terminal device; and
determining, by the first terminal device, whether to perform discovery of a next-hop relay device,
wherein the first information comprises at least one piece of the following information: information of a target device, service information to be discovered, or information of the second terminal device, wherein the determining, by the first terminal device, whether to perform the discovery of the next-hop relay device comprises at least one of the following:
determining, by the first terminal device, to perform the discovery of the next-hop relay device if setting information of the first terminal device indicates that the first terminal device is allowed to function as the relay device, wherein the setting information of the first terminal device is set by a network device; or
determining, by the first terminal device, whether to perform the discovery of the next-hop relay device according to whether the target device has been discovered,
wherein the method further comprises:
if a hop count for the second terminal device in relay transmission is greater than or equal to a first threshold, determining, by the first terminal device, not to perform the discovery of the next-hop relay device; or
if the hop count for the second terminal device in the relay transmission is less than the first threshold, determining, by the first terminal device, to perform the discovery of the next-hop relay device.

2. The method according to claim 1, further comprising:
if it is determined by the first terminal device to perform the discovery of the next-hop relay device, sending, by the first terminal device, second information for the discovery of the relay device to a fourth terminal device, wherein the second information comprises the content of the first information, and
the second information further comprises at least one piece of the following information:
information of the first terminal device, PLMN information of the first terminal device, and information of a group to which the first terminal device belongs.

3. The method according to claim 2, further comprising:
receiving, by the first terminal device, response information to the second information sent by the fourth terminal device; and
forwarding, by the first terminal device, the response information to the second terminal device.

4. The method according to claim 2, wherein the second information further comprises information on a hop count for the first terminal device in the relay transmission and a first threshold.

5. The method according to claim 1, wherein the determining, by the first terminal device, whether to perform the discovery of the next-hop relay device according to whether the target device has been discovered comprises:
if the target device has been discovered, determining, by the first terminal device, not to perform the discovery of the next-hop relay device.

6. The method according to claim 1, wherein the first threshold is set by the network device, or the first threshold is carried in the first information.

7. The method according to claim 1, further comprising:
updating, by the first terminal device, information on a hop count for the second terminal device in relay transmission, wherein the information on the hop count is comprised in the first information.

8. A terminal device, wherein the terminal device is a first terminal device, and the terminal device comprises:
a transceiver;
a processor; and
a memory configured to store a computer program executable by the processor,
wherein the transceiver is configured to receive first information sent by a second terminal device, wherein the first information is used for discovery of a relay device, the second terminal device is another relay device other than said relay device, and the first terminal device is a next-hop relay device of the second terminal device; and wherein the processor is configured to determine whether to perform discovery of a next-hop relay device, wherein the first information comprises at least one piece of the following information: information of a target device, service information to be discovered, or information of the second terminal device, wherein the processor is configured to perform at least one of the following:

determining to perform the discovery of the next-hop relay device if setting information of the first terminal device indicates that the first terminal device is allowed to function as the relay device, wherein the setting information of the first terminal device is set by a network device; or determining whether to perform the discovery of the next-hop relay device according to whether the target device has been discovered, wherein the processor is further configured to perform at least one of the following:

if a hop count for the second terminal device in relay transmission is greater than or equal to a first threshold, determine not to perform the discovery of the next-hop relay device; or if the hop count for the second terminal device in the relay transmission is less than the first threshold, determine to perform the discovery of the next-hop relay device.

9. The terminal device according to claim 8, wherein the transceiver is configured to:
  if it is determined by the first terminal device to perform the discovery of the next-hop relay device, send second information for the discovery of the relay device to a fourth terminal device, wherein the second information comprises the content of the first information, and
  the second information further comprises at least one piece of the following information:
  information of the first terminal device, PLMN information of the first terminal device, and information of a group to which the first terminal device belongs.

10. The terminal device according to claim 9, wherein the transceiver is configured to:
  receive response information to the second information sent by the fourth terminal device; and
  forward the response information to the second terminal device.

11. The terminal device according to claim 9, wherein the second information further comprises information on a hop count for the first terminal device in the relay transmission and a first threshold.

12. The terminal device according to claim 8, wherein the processor is configured to:
  if the target device has been discovered, determine not to perform the discovery of the next-hop relay device.

13. The terminal device according to claim 8, wherein the first threshold is set by the network device, or the first threshold is carried in the first information.

14. The terminal device according to claim 8, wherein the processor is configured to:
  update information on a hop count for the second terminal device in relay transmission, wherein the information on the hop count is comprised in the first information.

* * * * *